(12) United States Patent
Haack

(10) Patent No.: US 10,716,380 B2
(45) Date of Patent: Jul. 21, 2020

(54) METHOD AND APPARATUS FOR TRANSPORTING A WHEELED CASE

(71) Applicant: Scott G. Haack, Chardon, OH (US)

(72) Inventor: Scott G. Haack, Chardon, OH (US)

( * ) Notice: Subject to any disclaimer, the term of this patent is extended or adjusted under 35 U.S.C. 154(b) by 0 days.

(21) Appl. No.: 16/371,892

(22) Filed: Apr. 1, 2019

(65) Prior Publication Data

US 2019/0298028 A1 Oct. 3, 2019

Related U.S. Application Data

(60) Provisional application No. 62/651,437, filed on Apr. 2, 2018.

(51) Int. Cl.
| | | |
|---|---|---|
| *A45F 5/02* | (2006.01) | |
| *B62B 5/00* | (2006.01) | |
| *A45C 13/38* | (2006.01) | |
| *A45C 13/26* | (2006.01) | |
| *B62B 5/06* | (2006.01) | |

(52) U.S. Cl.
CPC ............ *A45C 13/38* (2013.01); *A45C 13/262* (2013.01); *A45F 5/021* (2013.01); *B62B 5/068* (2013.01)

(58) Field of Classification Search
CPC ....... A45C 13/262; A45C 13/38; A45F 5/021; B62B 5/068; A63B 2055/604
USPC ................................................ 224/184, 677
See application file for complete search history.

(56) References Cited

U.S. PATENT DOCUMENTS

| | | | | |
|---|---|---|---|---|
| 3,848,890 A | * | 11/1974 | MacAlpine | B62K 27/12 280/204 |
| 4,762,257 A | * | 8/1988 | Spillers | A62B 35/0037 224/250 |
| D367,142 S | * | 2/1996 | Platt | D29/124 |
| 5,622,294 A | * | 4/1997 | Evans | B62B 5/068 224/184 |
| 6,027,001 A | * | 2/2000 | Levitan | A45F 3/14 224/184 |
| 6,029,870 A | * | 2/2000 | Giacona, III | A45F 3/14 224/148.6 |
| 6,098,993 A | * | 8/2000 | Bellinson | B62B 9/20 280/1.5 |
| 6,131,780 A | * | 10/2000 | Becker | A45F 3/04 224/148.6 |
| 6,349,949 B1 | * | 2/2002 | Gorringe | B62B 5/068 280/1.5 |
| 6,431,556 B1 | * | 8/2002 | Beardsley | B62B 5/068 224/184 |
| 6,497,349 B1 | * | 12/2002 | Ramirez | A45F 5/00 224/200 |
| 6,729,517 B2 | * | 5/2004 | Grover | A45F 5/02 224/195 |

(Continued)

FOREIGN PATENT DOCUMENTS

| | | | | |
|---|---|---|---|---|
| DE | 202014007325 U1 | * | 10/2014 | ............. B62B 5/064 |
| GB | 2429900 A | * | 3/2007 | ............. A63B 55/60 |
| WO | WO-2018148826 A1 | * | 8/2018 | ............. B62B 9/20 |

Primary Examiner — Justin M Larson
(74) Attorney, Agent, or Firm — Sand, Sebolt & Wernow Co., LPA

(57) ABSTRACT

An apparatus for transporting a wheeled case, such as an article of luggage, utilizing a belt with a connector to secure the wheeled case to the users back is provided. The apparatus may connect the handle of the wheeled case to the user's back and may allow the user to maneuver the wheeled case behind his or herself without further use of their hands.

16 Claims, 19 Drawing Sheets

(56) References Cited

U.S. PATENT DOCUMENTS

| | | | | |
|---|---|---|---|---|
| 6,978,485 B2* | 12/2005 | Stude | | B62B 5/068 2/312 |
| 7,007,956 B1* | 3/2006 | Pinon | | B62B 5/068 224/184 |
| 7,185,796 B2* | 3/2007 | Parsons | | A45F 5/02 224/197 |
| 7,246,802 B2* | 7/2007 | Yeung | | B62D 63/064 190/108 |
| 7,611,161 B2* | 11/2009 | Gross | | B62B 5/0026 280/1.5 |
| 7,938,409 B2* | 5/2011 | Mejia | | B62B 5/068 224/184 |
| 8,056,781 B1* | 11/2011 | Rowe | | A45F 3/14 224/184 |
| 8,091,899 B2* | 1/2012 | Mejia | | B62B 5/068 224/184 |
| 8,267,409 B2* | 9/2012 | Gross | | B62B 5/0026 280/1.5 |
| 8,573,359 B2* | 11/2013 | West | | A62B 5/00 182/3 |
| 8,801,322 B2* | 8/2014 | Shalaby | | B62B 3/12 24/270 |
| 9,033,197 B2* | 5/2015 | Bar | | A45F 5/02 224/162 |
| 9,101,200 B2* | 8/2015 | Dickson | | A45F 5/021 |
| 9,365,229 B2* | 6/2016 | Ortega | | B62B 1/10 |
| 9,795,209 B2* | 10/2017 | Rivera | | A45F 5/02 |
| 9,840,266 B2* | 12/2017 | Caradec | | B62B 5/068 |
| 10,328,963 B2* | 6/2019 | Johnson | | B62B 5/068 |
| 2004/0016781 A1* | 1/2004 | Smith | | B62B 5/068 224/184 |
| 2005/0115998 A1* | 6/2005 | Swenson | | B62B 5/068 224/184 |
| 2006/0196901 A1* | 9/2006 | Benk | | A45C 13/30 224/184 |
| 2007/0187910 A1* | 8/2007 | Adams | | B62B 5/068 280/1.5 |
| 2008/0018063 A1* | 1/2008 | Morowat | | B62B 5/068 280/1.5 |
| 2008/0296326 A1* | 12/2008 | Berlin | | A45F 3/14 224/184 |
| 2009/0057355 A1* | 3/2009 | Weiss | | A45F 3/14 224/184 |
| 2011/0062196 A1* | 3/2011 | Weiss | | A45F 3/14 224/184 |
| 2013/0048685 A1* | 2/2013 | Durkos | | A45F 3/14 224/184 |
| 2015/0374089 A1* | 12/2015 | Lian | | A45C 13/38 224/184 |
| 2015/0374103 A1* | 12/2015 | Lian | | A45F 5/021 224/184 |

* cited by examiner

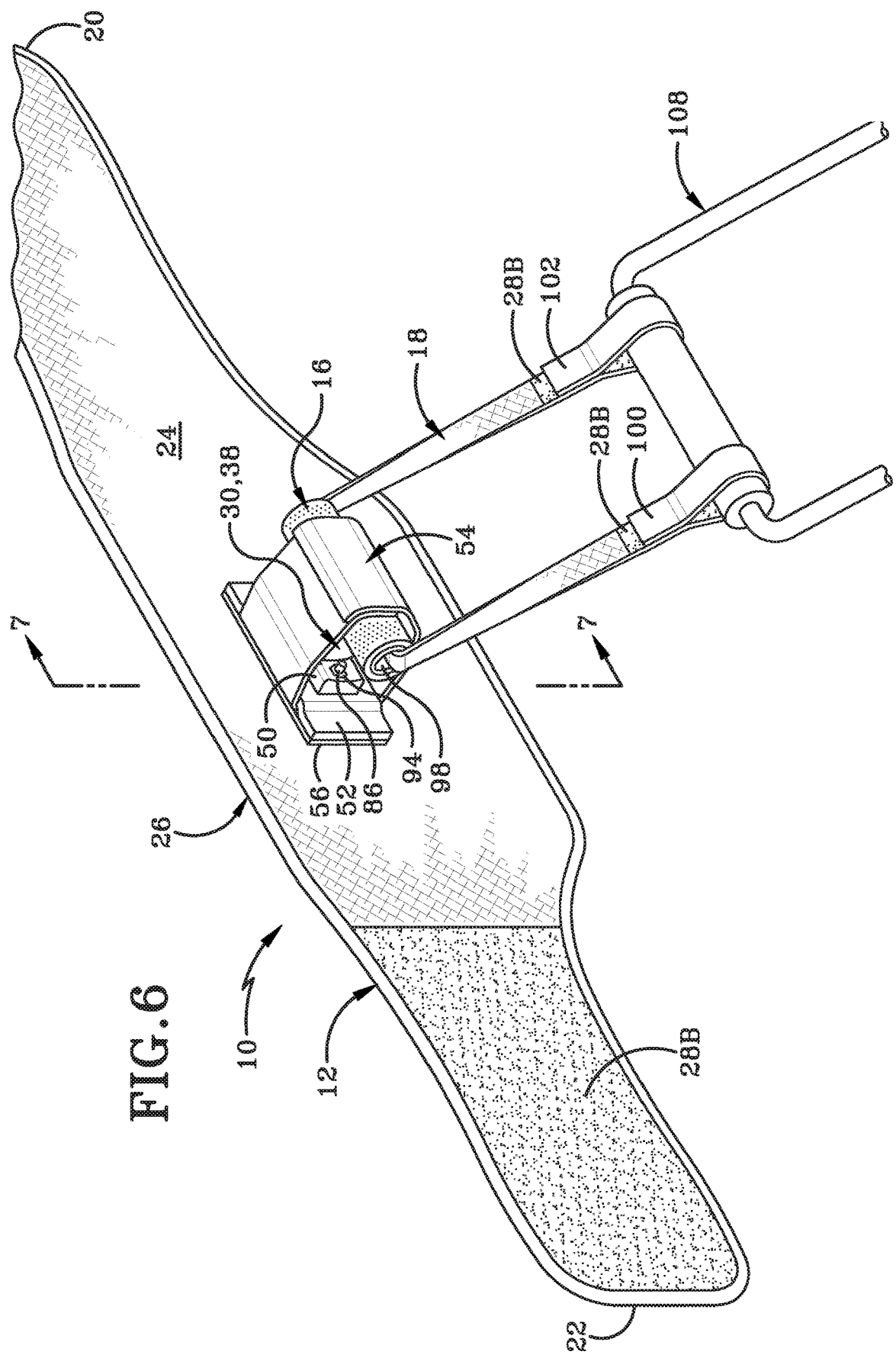

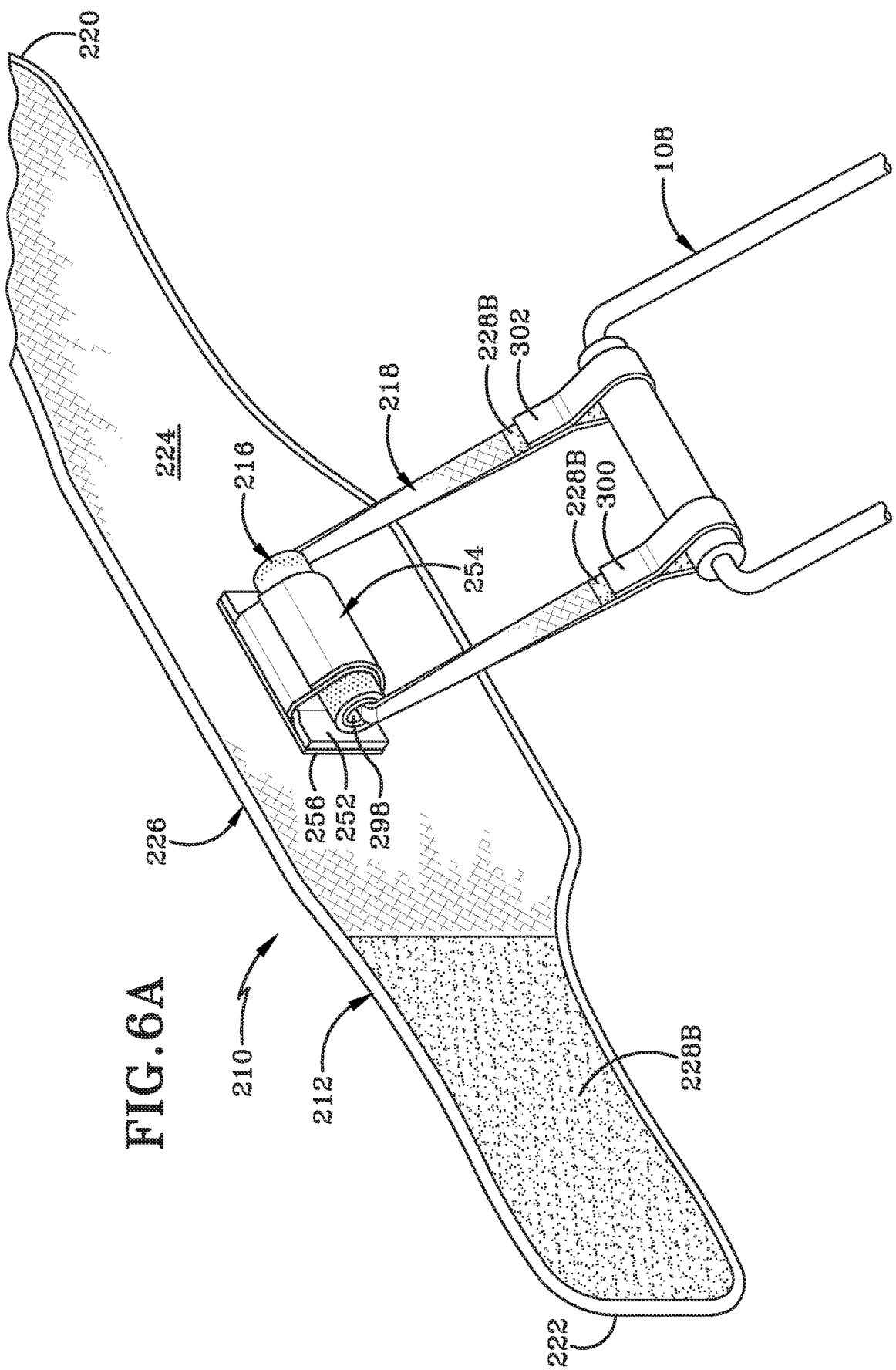

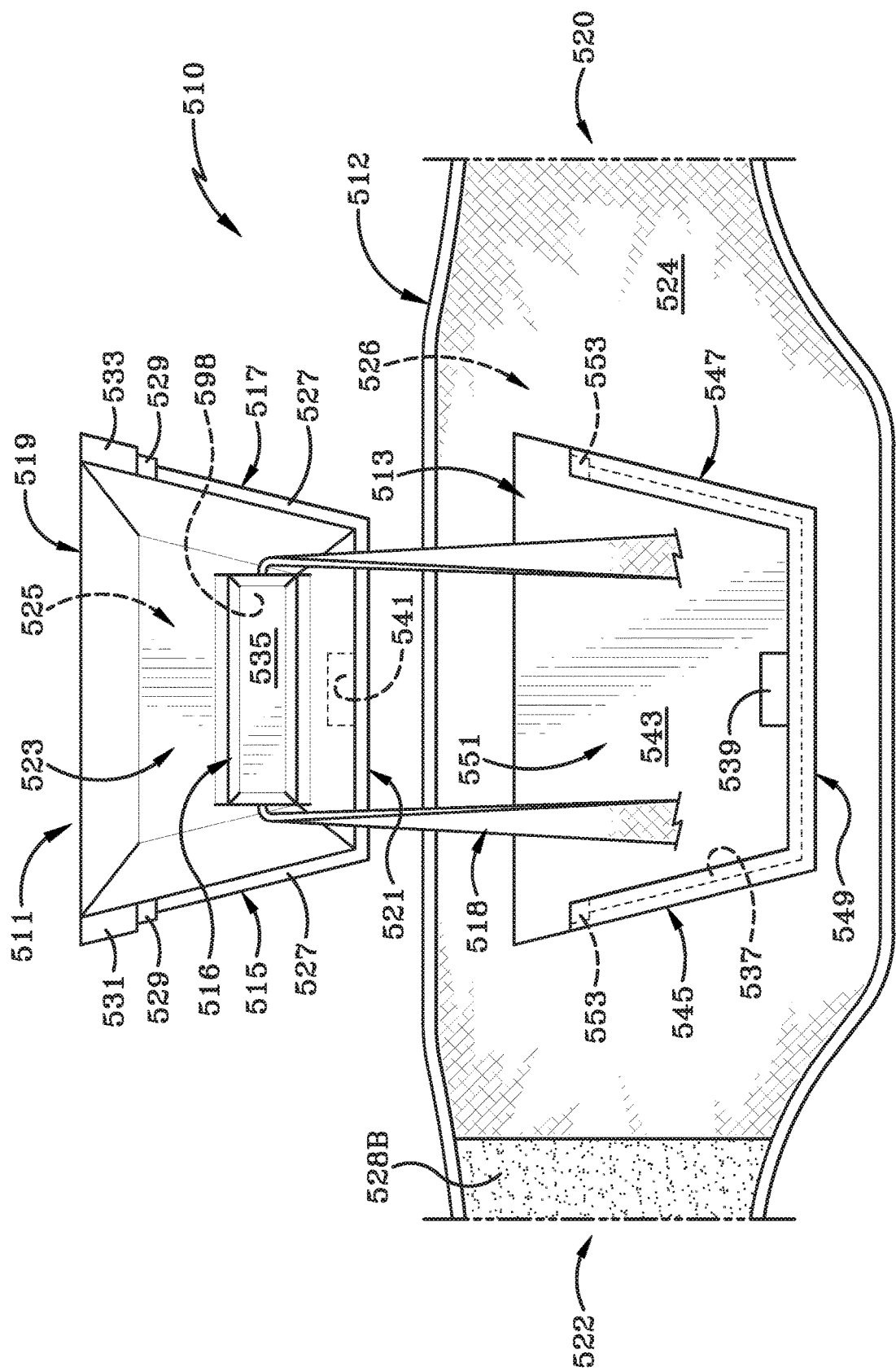

METHOD AND APPARATUS FOR TRANSPORTING A WHEELED CASE

CROSS REFERENCE TO RELATED APPLICATIONS

This application claims the benefit of U.S. Provisional Application Ser. No. 62/651,437, filed on Apr. 2, 2018; the disclosure of which is incorporated herein by reference.

BACKGROUND

Technical Field

The present disclosure relates generally to the field of transportation and luggage handling. More particularly the present disclosure relates to a tool for handling and transporting a wheeled case. Specifically the present disclosure relates to a wearable tool to assist the wearer in handling and transporting wheeled luggage or a similar wheeled case.

Background Information

Traditionally when people travel, particularly by means of mass transportation such as airplanes, buses, trains, and the like, they often take with them clothing and personal effects for the length of their expected travel. Commonly people are known to use luggage that is equipped with handles and wheels to assist them in carrying and transporting these items with them. Often, these suitcases may be large and unwieldy and difficult to manage even with the added convenience of extended handles and wheels.

When traveling for business, people tend to have an article of luggage with personal effects, as well as additional luggage for transporting business items, such as computers and other electronics. When traveling for pleasure, people tend to travel in groups, with friends and/or family, thereby increasing the number of articles of luggage accompanying them. Additionally, persons traveling for extended periods of time need additional luggage to insure that they have everything they need for their trip. It is therefore not unusual to see travelers moving thru areas such as airports, bus stations, or train stations, with a large amount of luggage in tow. This requires one or more hands to be occupied at all times with the luggage and makes it difficult to maneuver through crowds, gates, and walkways as the luggage may be excessive and unwieldy. Furthermore, it is not unusual to see travelers struggling to maneuver luggage while tending to other travelers, such as children or other travel companions, who may need assistance. Finally, as it is especially the case with mass transit, travelers are normally asked to carry on their person, and produce multiple times, documents such as personal identification, travel tickets, boarding passes, and the like. Often these requests to produce documents, or needs of other persons, require the traveler to release the handle of luggage and may cause the luggage to tip over or block a walkway. In other instances, a person may release the luggage handle to tend to another need and forget a piece of luggage, later walking away and abandoning the bag, which may be costly and sometimes dangerous, as security personnel may view an abandoned bag as a threat.

SUMMARY

The present disclosure addresses these and other issues by providing a way for a traveler to manage and maneuver luggage while leaving their hands free to tend to other travelers, luggage, and/or other matters, such as producing requested documents or identification, and the like.

In one aspect, the present disclosure may provide an apparatus for transporting a wheeled case comprising: a belt; and a connector secured to the back of the belt and adapted to connect to a handle of a wheeled case.

In another aspect, the present disclosure may provide a method of transporting a wheeled case comprising the steps of: securing a belt having a connector attached to the back thereof to a user's waist; attaching a handle of a wheeled case to the connector to secure the wheeled case to the user's back; and causing the wheeled case to be moved without further interaction by the user's hands.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6 is a top left isometric rear view of a transport device with an article of luggage installed and secured.

FIG. 6A is a top left isometric rear view of a first alternate embodiment of a transport device with an article of luggage installed and secured.

FIG. 9 is an enlarged and exploded rear elevation view of a second alternate embodiment of a transport device.

DETAILED DESCRIPTION

Figure 1:
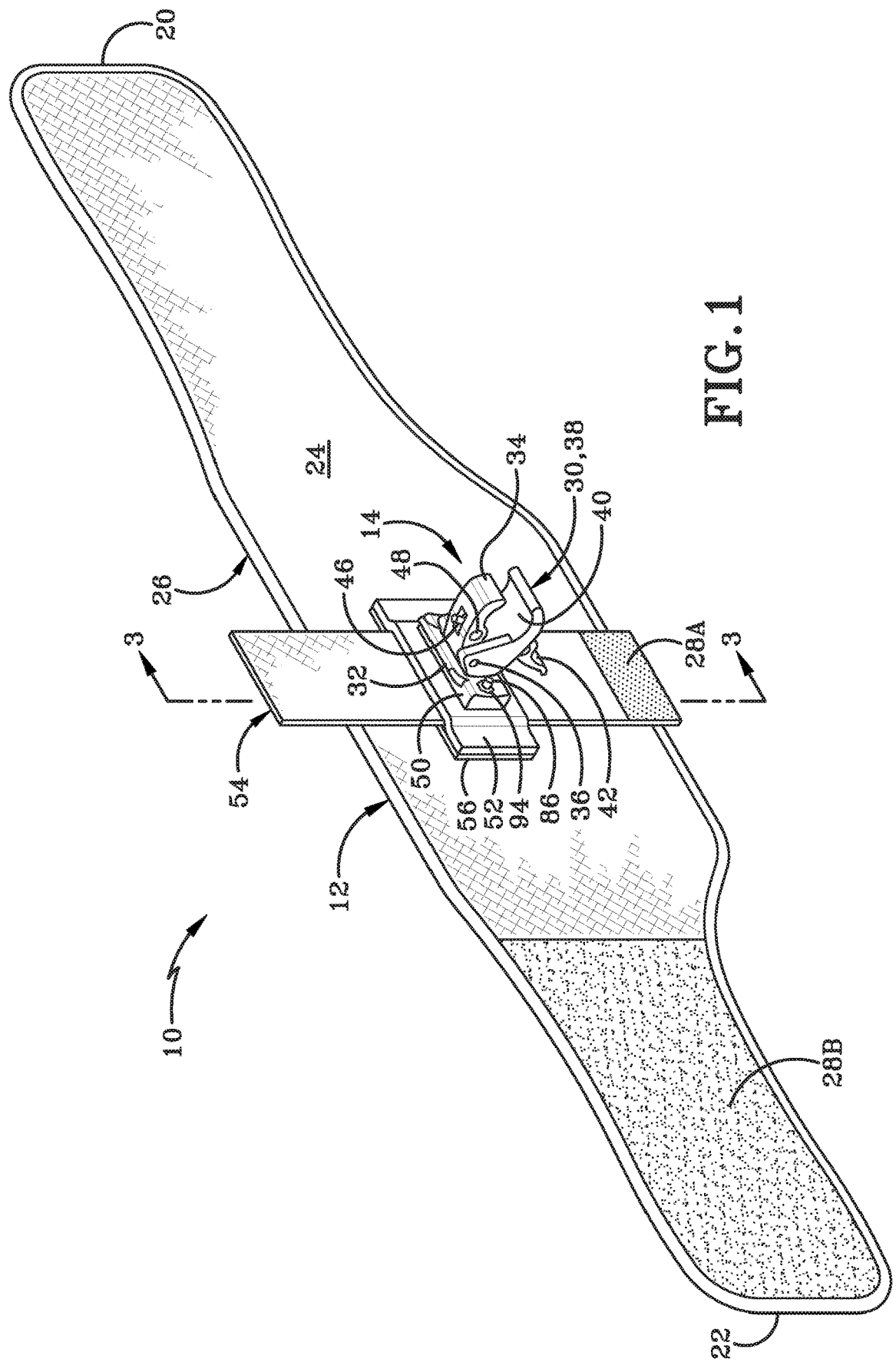
FIG. 1 is a top left isometric rear view of a transport device.

Described herein, in its most general sense, is a device for securing a wheeled case, such as a suitcase or another piece of luggage, to a person's back using a belt having a connector thereon. The device may be an apparatus for transporting a wheeled case, hereinafter referred to as a transport device, may be used to allow a person to connect a wheeled case to their back and transport the same without using their hands. As discussed in detail below, various different types of connectors and features may be used with transport device to allow for such hands-free transportation of a wheeled case.

Accordingly, transport device 10 may include a belt 12, a clamp assembly 14, a handle 16, and a strap 18.

With reference to FIGS. 1-8A, belt 12 may have a first end 20, a second end 22, an outer surface 24, and an inner surface 26. First end 20 and second end 22 may include hook and loop type closures 28A and 28B, respectively. As used throughout this specification, and in the FIGURES, reference 28A refers to a hook portion of a hook and loop closure 28 and reference 28B refers to a loop portion of a hook and loop closure 28. However, as may be appreciated, these elements may be reversed or interchanged as desired by a person skilled in the art.

Belt 12 may be constructed of a fabric material, a leather material, or any other material appropriately chosen according to the desired implementation. According to one aspect, belt 12 may be constructed from a nylon, Lycra, or spandex material, or a blend thereof, and may include one or more layers of material as desired. According to another aspect, belt 12 may incorporate multiple fabrics or materials into differing zone, such as a breathable fabric material zone that would align with the small of the wearer's back when worn.

Outer surface 24 of belt 12 is defined as the surface not in contact with or otherwise facing away from the body when belt 12 is worn. Inner surface 26 of belt 12 is defined as the surface of belt 12 in contact with or otherwise facing the body when belt 12 is worn. Belt 12 may be of sufficient size and/or adjustable to accommodate most users regardless of waist size. Belt 12 may include optional extensions in instances where a larger size is required. Belt 12 may include additional loop closure 28B areas (not shown) to accommodate users of smaller stature. As discussed below, belt 12 may further include an adjustable strap (such as band 728) to adjust the size to fit a user's waist.

According to one aspect, belt 12 may be a modified back support belt. According to another aspect, belt 12 may offer lower back and lumbar support to the user while transporting a wheeled case 106 (referred to herein as wheeled case 106 106, article of luggage 106, or luggage 106, interchangeably). As discussed herein, belt 12 may also be worn without attaching to a wheeled case 106. Further according to this aspect, wearing belt 12 without attachment to a wheeled case 106 may still provide user with lower back and lumbar support.

Figure 1A:
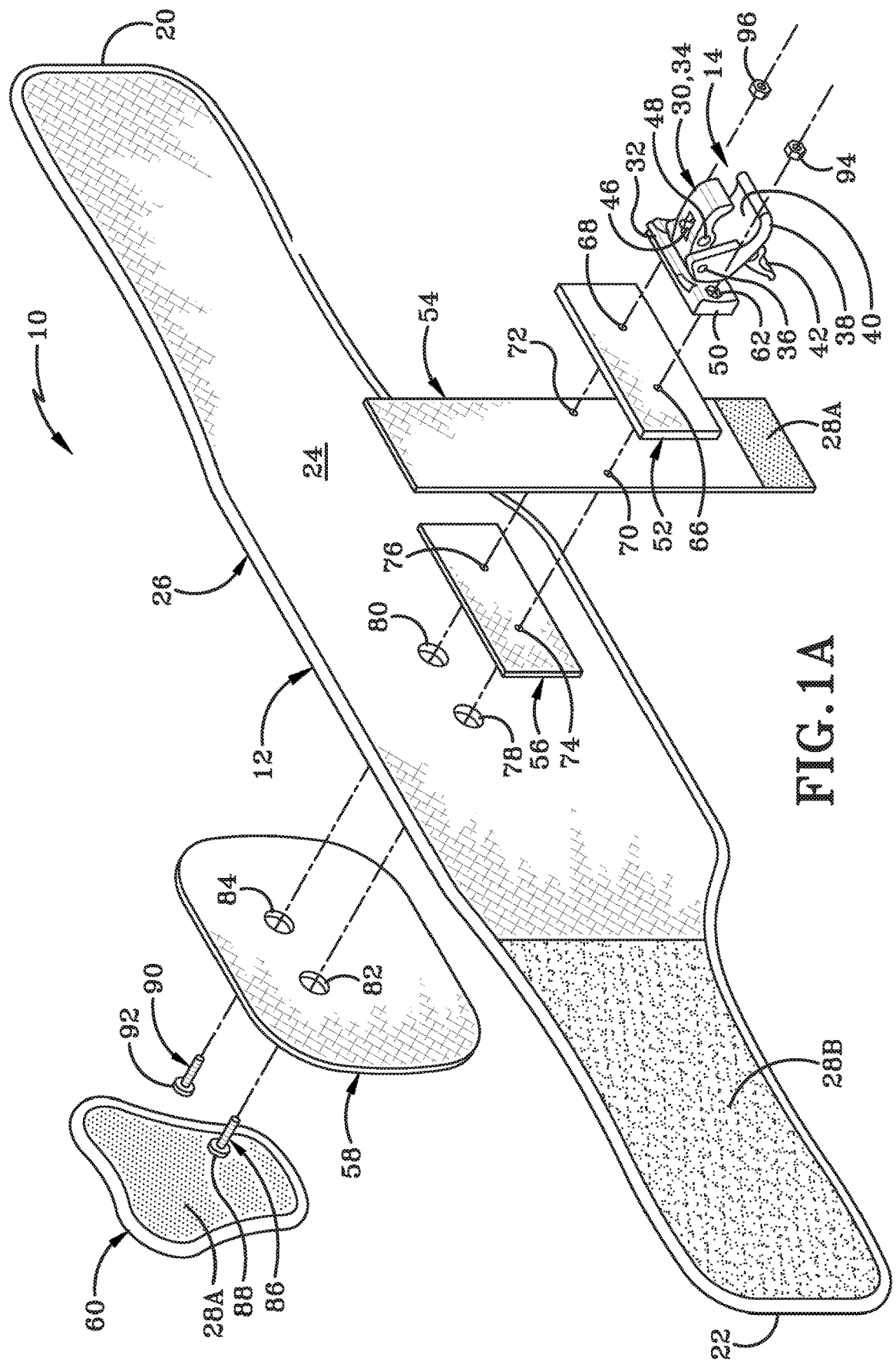
FIG. 1A is a top left isometric rear exploded view of a transport device.
Figure 2:
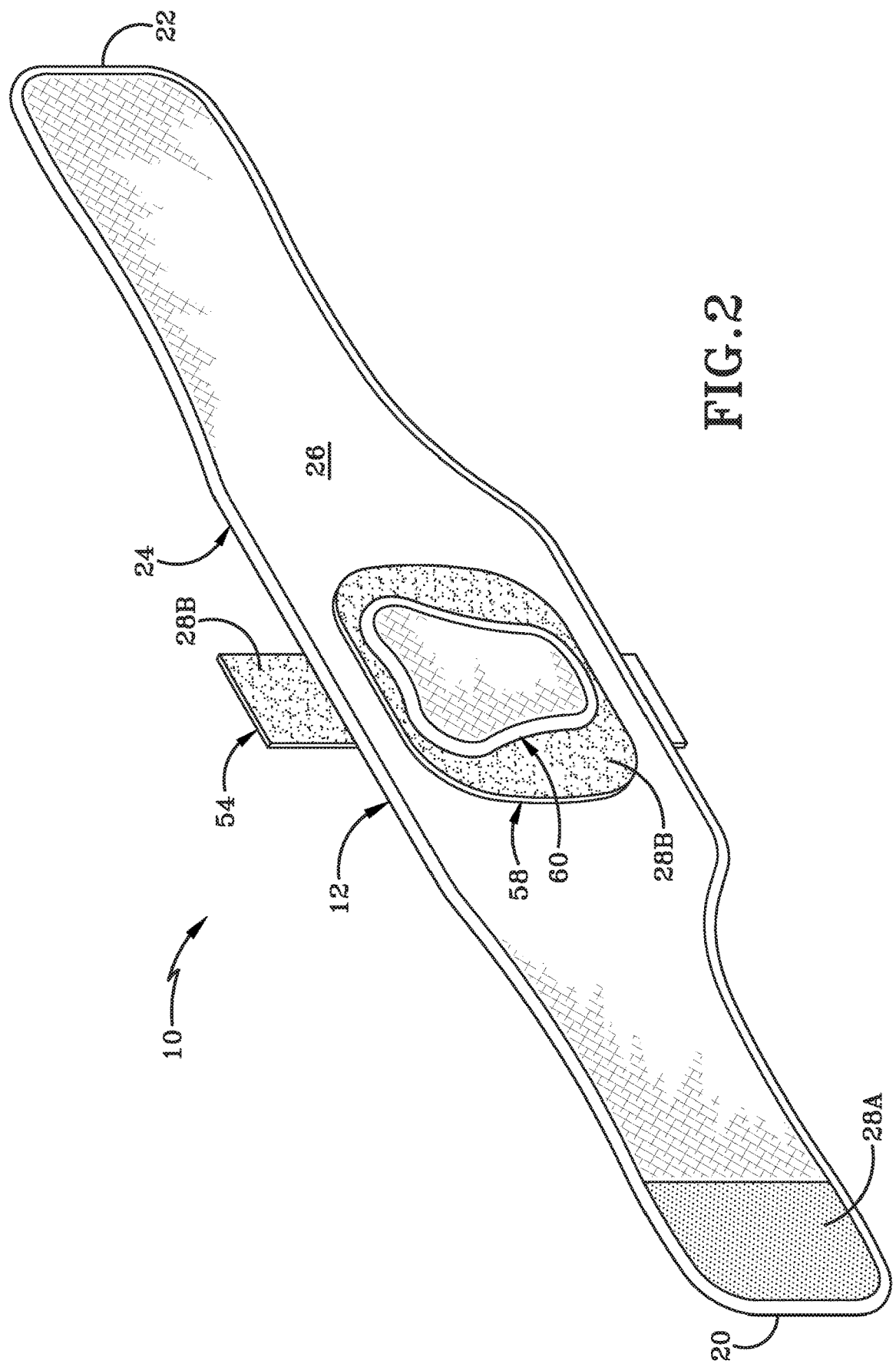
FIG. 2 is a top right isometric front view of a transport device.
Figure 2A:
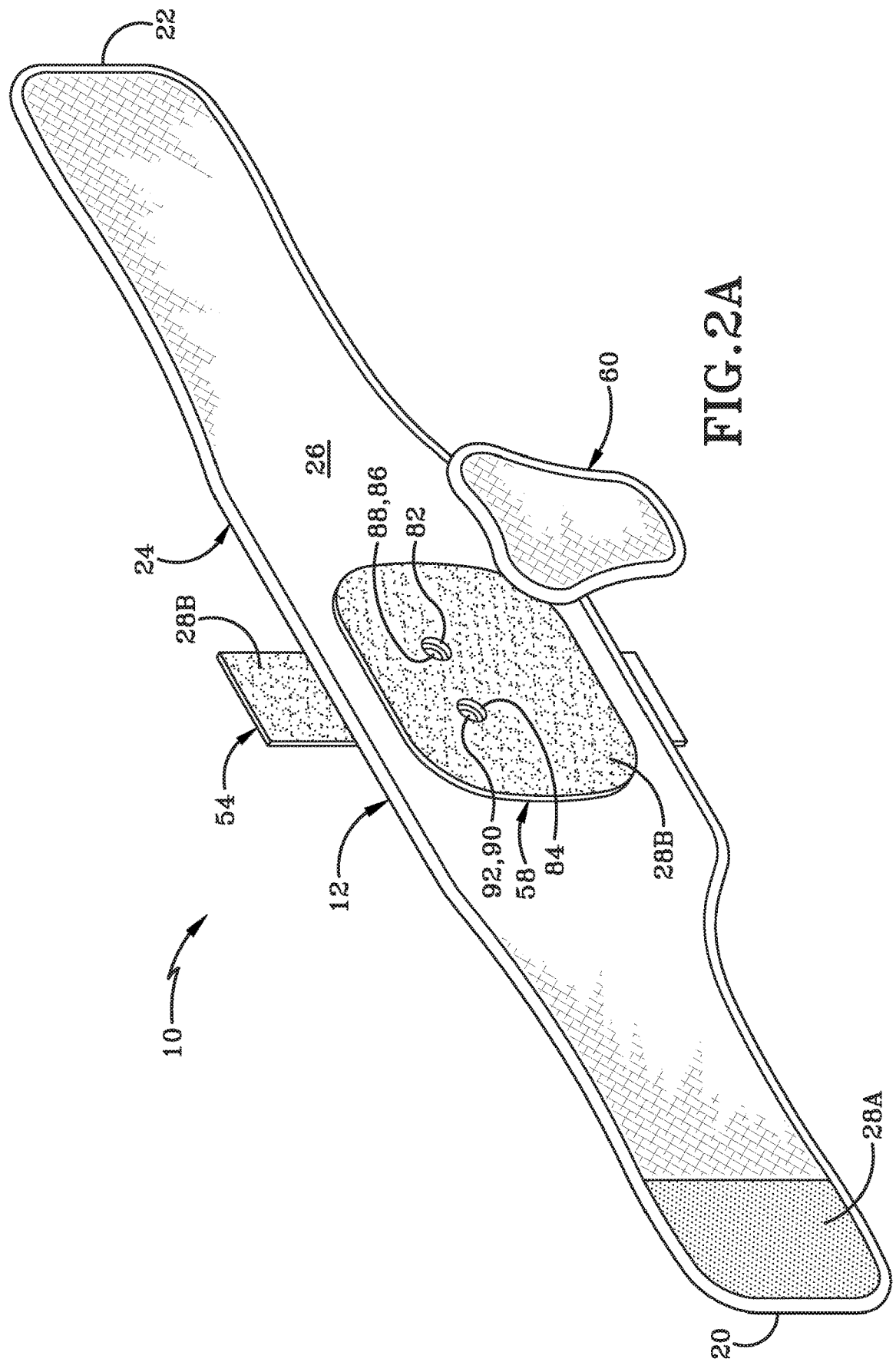
FIG. 2A is a top right isometric front exploded view of a transport device.
Figure 3:
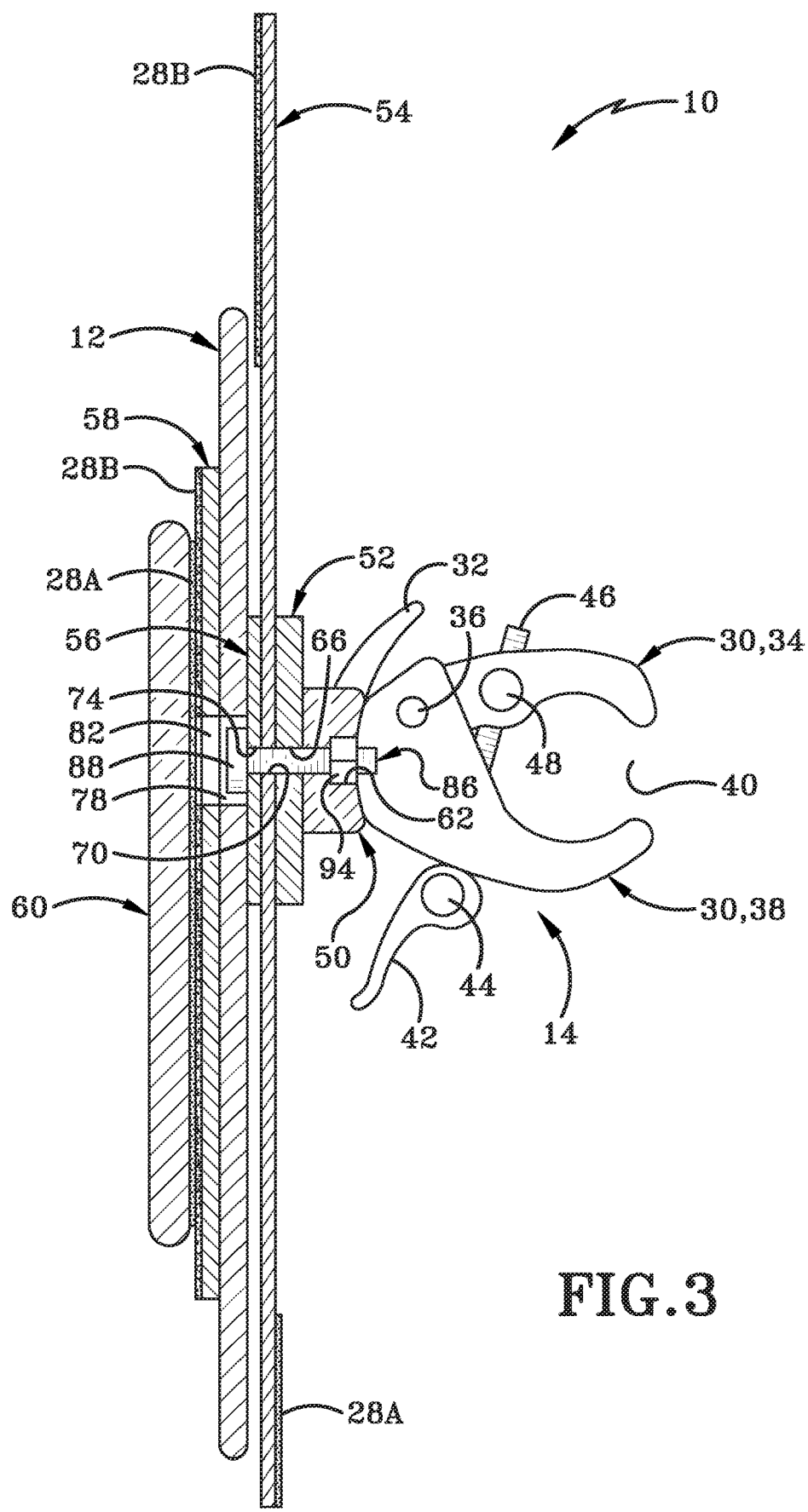
FIG. 3 is a left side cross-section view of a transport device taken along Line 3-3 from FIG. 1.

With reference to FIGS. 1, 1A, 3-5, and 7, but as best seen in FIGS. 1A and 3, clamp assembly 14 may include a clamp generally indicated at 30. Clamp 30 may further include lip 32, upper jaw 34, clamp hinge 36, lower jaw 38, clamp mouth 40, toggle 42, toggle hinge 44, toggle screw 46, toggle nut 48, clamp base 50, and clamp assembly restraint 54. Upper jaw 34 and lower jaw 38 of clamp 30 are pivotally connected about clamp hinge 36 which may allow upper jaw 34 and lower jaw 38 to open and close with the operation of toggle 42.

According to one aspect, clamp 30 may be fixed to clamp base 50. According to another aspect, clamp 30 may be connected to clamp base 50 in a manner that may permit clamp 30 to rotate freely relative to clamp base 50. By way of one non-limiting example, this rotation may be achieved by use of a partial thread bolt (not shown) to attach clamp 30 to clamp base 50. Other suitable fixed or rotating connectors may be used as desired.

Toggle 42 may be pivotal about toggle hinge 44, and in connection with toggle screw 46 and toggle nut 48, may rotate between an open and closed position wherein when in the open position, the upper jaw 34 and lower jaw 38 of clamp 30 are similarly open. When toggle 42 is in the closed position, the upper jaw 34 and lower jaw 38 of clamp 30 are in the closed position. Toggle 42 along with toggle hinge 44, toggle screw 46 and toggle nut 48 are known components in the art and may be used in a manner according to known methods.

As best seen in FIG. 1A, transport device 10 may further include an outer plate 52 which may be constructed of fabric similar to the fabric used in construction of belt 12. Outer plate 52 may alternatively be constructed of a rigid or semi-rigid material, such as plastic or metal. According to one aspect, when outer plate 52 is constructed of a semi-rigid or rigid material, outer plate 52 may include a fabric cover.

Transport device 10 may further include inner plate 56. Similar to outer plate 52, inner plate 56 may be constructed of fabric or of a semi-rigid or rigid material. According to one aspect, inner plate 56 may likewise be covered in fabric when inner plate 56 comprises a rigid or semi-rigid material.

Transport device 10 may further include lumbar plate 58 and lumbar pad 60. As discussed above with respect to outer plate 52 and inner plate 56, lumbar plate 58 may again be constructed of fabric or a semi-rigid or rigid material that may or may not be covered with fabric. Lumbar pad 60 may be constructed of a light-weight foam or cushioning material optionally encased in fabric. According to one aspect, lumbar plate 58 may have a surface comprising loop closures 28B while lumbar pad 60 may have a corresponding surface comprising hook closures 28A which may allow secure attachment of lumbar pad 60 to lumbar plate 58, as best seen in FIGS. 1A-2A. According to another aspect, lumbar plate 58 may be material or covered in material that may readily attach to hook closures 28A With reference to FIGS. 1-3, but best seen in FIG. 1A, transport device 10 may be assembled in layers. As seen in FIG. 1A, clamp base 50, outer plate 52, clamp assembly restraint 54, inner plate 56, belt 12, lumbar plate 58, and lumbar pad 60 are all attachable to and detachable from transport device 10. According to one aspect, clamp base 50 includes a first clamp base aperture 62 and second clamp base aperture 64 disposed on either side of clamp 30. Corresponding to first clamp base aperture and second clamp base aperture 62 and 64, outer plate 52 may have first outer plate aperture 66 and second plate aperture 68; clamp assembly restraint 54 may have first strap aperture 70 and second strap aperture 72; inner plate 56 may have first inner plate aperture 74 and second inner plate aperture 76; belt 12 may have first belt aperture 78 and second belt aperture 80; and lumbar plate 58 may have first lumbar plate aperture 82 and second lumbar plate aperture 84.

Assembly of transport device 10 may align each of the first series of apertures from each corresponding element (i.e. 62, 66, 70, 74, 78, and 82). Similarly, when assembled, transport device 10 may align each of the second series of apertures from each corresponding element (i.e. 64, 68, 72, 76, 80, and 84). First bolt 86 may then pass through each of the first series of apertures in reverse order from first lumbar plate aperture 82 through first clamp base aperture 62. Similarly, second bolt 90 may pass through the second series of apertures in reverse order from second lumbar plate aperture 84 through second clamp base aperture 64. First bolt 86 and second bolt 90 may be sized such that first bolt head 88 and second bolt head 92 may be recessed within first lumbar plate aperture 82 and second lumbar plate aperture 84, respectively. According to another aspect, first bolt head 88 and second bolt head 92 may be recessed within first belt aperture 78 and second belt aperture 80. First clamp base aperture 62 and second clamp base aperture 64 may be sized and shaped to receive first nut 94 and second nut 96 in such a manner as to secure first and second nut 94, 96 from rotating when first and second bolt 86 and 90 are threaded therethrough, thus securing all components of transport device 10 together. According to another aspect, first bolt 86 and second bolt 90 may be any fastener, such as a screw or pin, as selected by a person skilled in the art without deviating from the scope disclosed herein.

According to another aspect, each component may include additional fasteners, such as hook and loop closures 28A and 28B or adhesives, or more permanent attachments, such as stitching or welding. By way of a non-limiting example, outer plate 52, clamp assembly restraint 54, and inner plate 56 may be stitched to each other and subsequently stitched or permanently or semi-permanently adhered to outer surface 24 of belt 12. Similarly, lumbar plate 58 may be stitched or semi-permanently or permanently adhered to inner surface 26 of belt 12.

According to one aspect, in combination with recessed placement of first bolt head 88 and second bolt head 92, lumbar pad 60 may attach to lumbar plate 58 as previously described utilizing hook and loop closure 28A and 28B, respectively, and be positioned such that first bolt head 88 and second bolt head 92 are completely covered by lumbar pad 60. Lumbar pad 60 may cushion the user's body from impacting first bolt head 88 and second bolt head 92 when transport device 10 is worn.

Transport device 10 may further include handle 16 and strap 18. Handle 16 may have a generally cylindrical shape and may have a hollow interior 98. According to one aspect, handle 16 may be constructed of rigid or semi-rigid material, such as metal or plastic. According to another aspect, handle 16 may be a rigid material covered in fabric or foam.

Strap 18 may have a first end 100 and a second end 102 with hook and loop closure 28A and 28B adhered thereto. According to one aspect, first end 100 and second end 102 of strap 18 may have loop closure 28B placed towards the midline of strap 18 with hook closure 28A spaced apart therefrom defining a section of strap 18 generally designated as 18A with no hook or loop closure installed thereon.

While transport device 10 may directly connect to the handle 108 of the wheeled case 106, strap 18 may be utilized to allow a user to adjust the position of the wheeled case 106 behind them while in use, as discussed below. Strap 18 may be adjustable in length through use of known methods and devices, such as slider clips (not shown) or the like.

Figure 8:
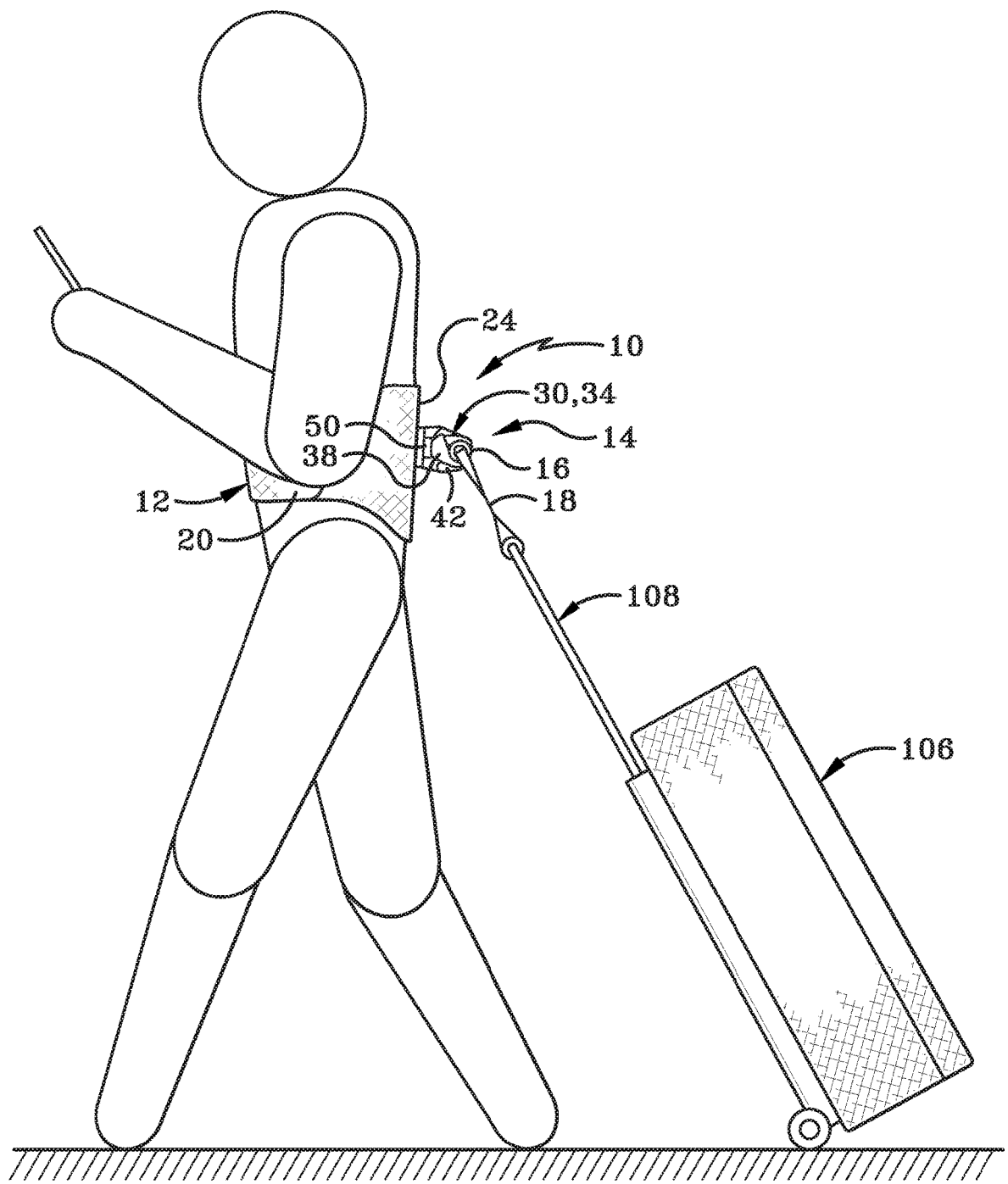
FIG. 8 is an operational view of a transport device with an article of luggage installed.
Figure 8A:
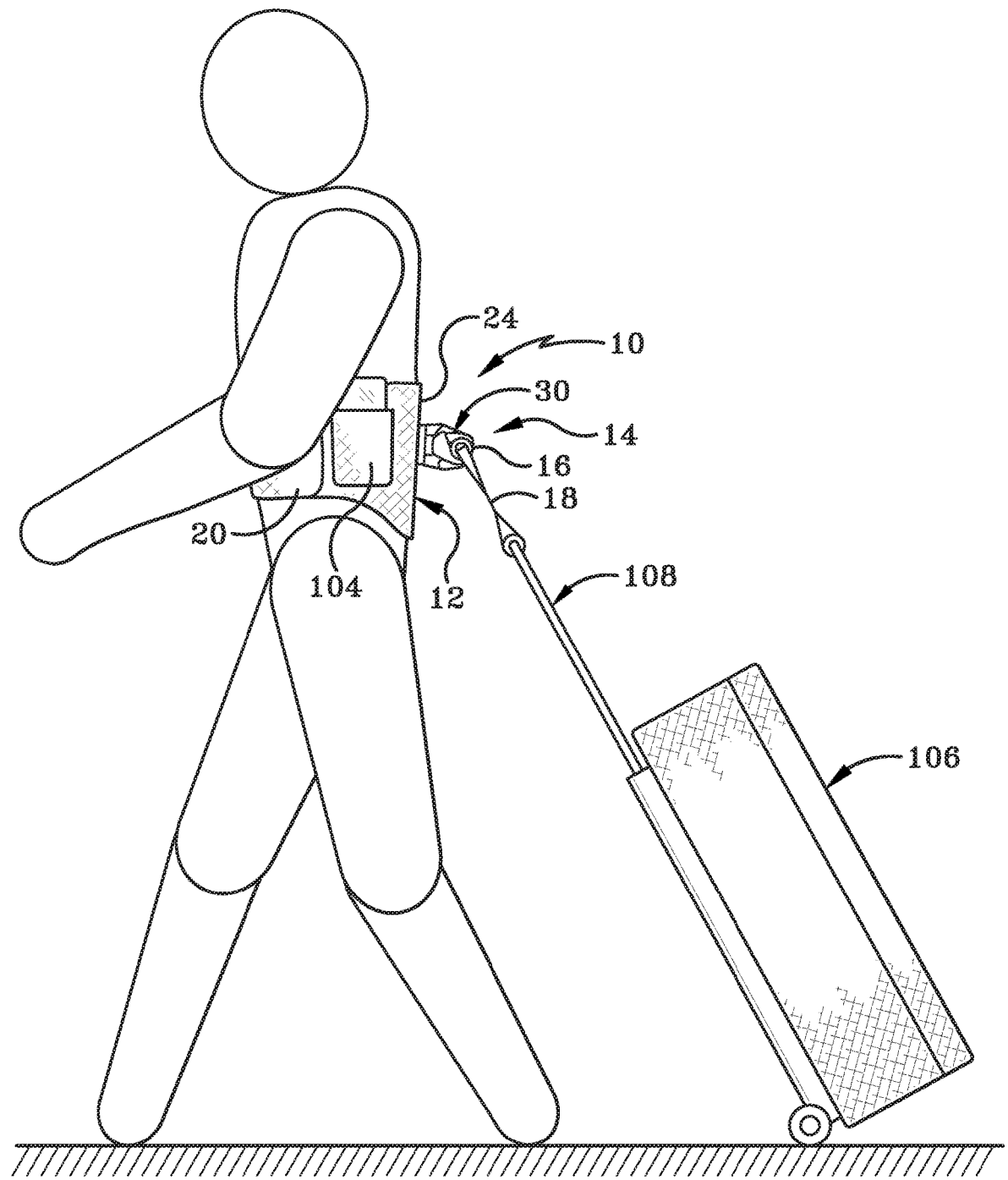
FIG. 8A is an operational view of a transport device with an optional accessory pocket attached.

With reference to FIG. 8A, transport device 10 may include an optional accessory pocket 104. Belt 12 may alternatively include more than one accessory pocket 104. According to one aspect, accessory pocket 104 may be stitched or affixed to belt 12 such that it is located substantially adjacent to a user's hip when belt 12 is worn.

According to another aspect, accessory pocket 104 may include hook closures 28A to allow accessory pocket 104 to attach to belt 12 in any location on outer surface 24 of belt 12. This may allow user to position accessory pocket 104 in the most convenient, secure, and/or comfortable position as they deem fit.

According to one aspect, accessory pocket 104 may include one or more closure device, such as a zipper, to secure objects securely within accessory pocket. According to another aspect, closure device may be any suitable device operable to secure accessory pocket opening, including, but not limited to, hook and loop closure, snaps, buttons, and the like.

With reference to FIG. 6A, a first alternative embodiment of a transport device is shown and generally indicated as transport device 210. Transport device 510 may consist of belt 212, outer plate 252, inner plate 256, lumbar plate 258, lumbar pad 260, handle 216, and strap 218. According to one aspect, transport device 210 may be substantially assembled in the same manner as transport device 10; however, transport device 210 does not include the full clamp assembly 14. Instead, transport device 210 may include only restraint 254 from clamp assembly 14 while eliminating clamp 30 and its associated components. According to this aspect, restraint 254 may have additional loop closures 228B to allow adjustment of the length of restraint 254 to properly secure handle 216 within restraint 254.

According to another aspect, transport device 10 may be converted to transport device 210 by removal of clamp assembly 14 from transport device 10. Likewise, transport device 210 may be converted back to transport device 10 by replacing clamp assembly 14 in transport device 210.

As with transport device 10 and strap 18, strap 218 of transport device 210 may be optional, but may allow for proper positioning behind the user, as discussed below. Strap 218 may likewise be adjustable in length.

Figure 10:
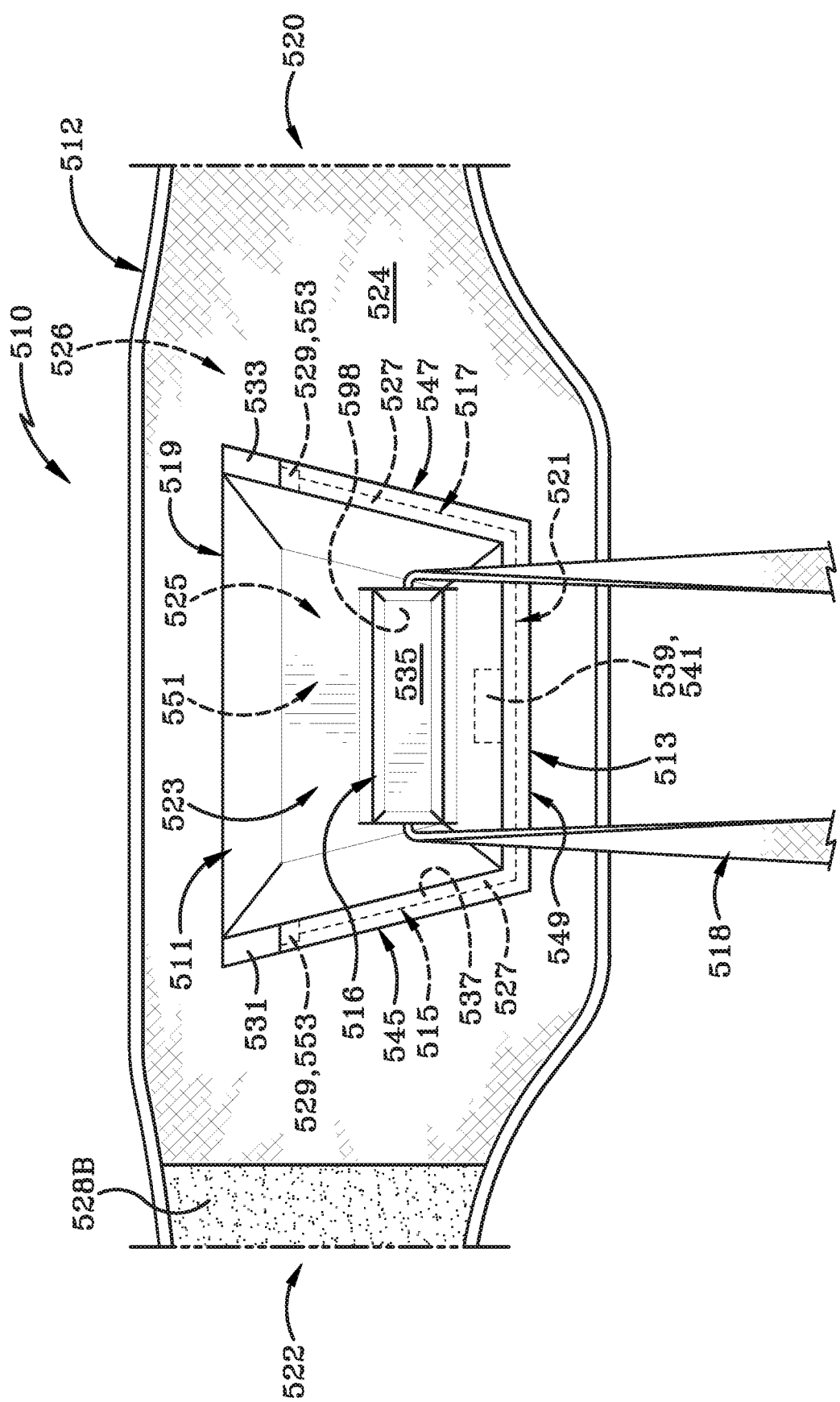
FIG. 10 is an enlarged rear elevation view of the second alternate embodiment of a transport device from FIG. 9.
Figure 11:
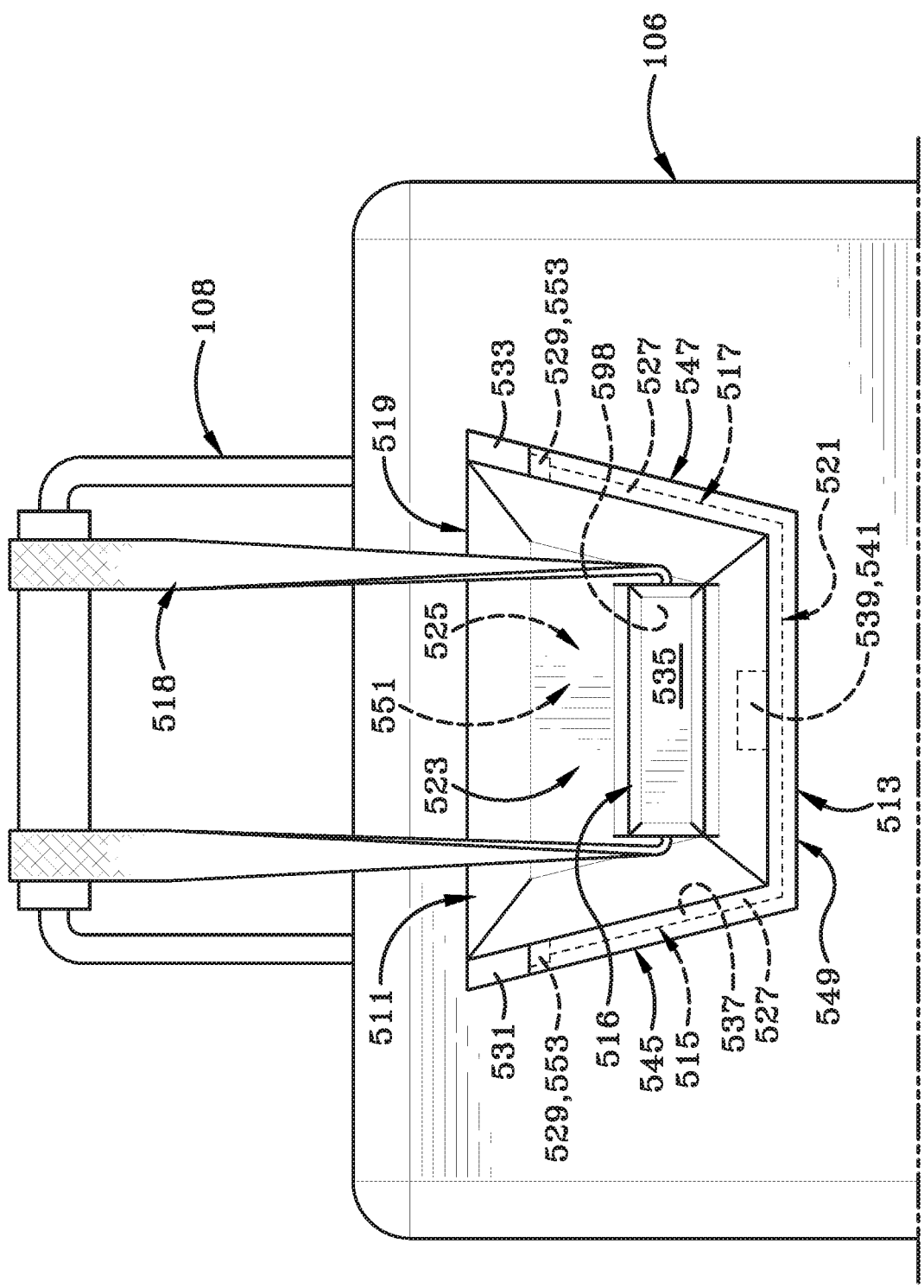
FIG. 11 is a rear elevation view of an article of luggage showing a portion of the second alternate embodiment of the transport device from FIG. 9 in a stowed condition.

With reference to FIGS. 9-11, a second alternative embodiment of a transport device is shown and generally indicated as transport device 510. Transport device 510 may consist of attachment plate 511, belt 512, attachment plate receiver 513, handle 516, and strap 518.

With reference to FIGS. 9 and 10, belt 512 of transport device 510 may be substantially similar to belt 12 of transport device 10 in that it may include one or more layers and have a first end 520, second end 522, outer surface 524, and inner surface 526, and may include hook and loop closures 528A (not shown) and 528B in a configuration substantially similar to belt 12.

Transport device 510 differs from transport device 10 in that transport device 510 does not include clamp assembly 14, outer plate 52, assembly restraint 54, or inner plate 56. Transport device may optionally include a lumbar plate and/or lumbar pad (not shown) that are substantially similar to lumbar plate 56 and lumbar pad 60.

According to this embodiment, transport device 510 includes attachment plate 511 which may be removably attached to belt 512 via interaction with attachment plate receiver 513, the operation of which is discussed more fully below. Attachment plate 511 may include a left edge 515, right edge 517, a top edge 519, a bottom edge 521, an outer side 523, and an inner side 525. Left edge 515 and right edge 517 may define therebetween a longitudinal direction. Top edge 519 and bottom edge 521 may define therebetween a vertical direction. The outer side 523 is generally defined as the side furthest away from a user's body when transport device 510 is worn while the inner side 525 is generally defined as the side closest to the user's body when transport device 510 is worn. Top and bottom edges 519, 521 may be substantially parallel and extend horizontally between the left and right edges 515, 517, and top edge 519 may have a length greater than bottom edge 521. Left and right edges 515, 517, may extend vertically between top and bottom edges 519, 521, connecting with the ends of top and bottom edges 519, 521 to substantially form a trapezoidal shape.

Left edge 515, right edge 517, and bottom edge 521 of attachment plate 511 may further include a flange 527 that may extend continuously around the lower perimeter of attachment plate 511. According to one aspect, flange 527 may begin on one of the left or right edges 515, 517 and terminate on the opposite edge. According to this aspect, flange 527 may have a total length that is less than the sum of the lengths of left edge 515, right edge 517, and bottom edge 521. Accordingly, the beginning and terminus of flange 527 may sit below and not come into contact with top edge 519.

Flange 527 may further include a projection at either terminus that may serve as a stop member 529 operable to help secure attachment plate 511 within attachment plate receiver 513, as discussed below.

Top edge 519 may further include a left extension 531 and a right extension 533 located exterior of top edge 519 at the uppermost portion of left and right edges 515 and 517 respectively. Left and right extensions 531, 533 may be aesthetic to create clean lines and appearances when attachment plate 511 is secured within attachment plate receiver 513, or alternatively, left and right extensions 531, 533 may be operable to help secure attachment plate 511 within attachment plate receiver 513.

Outer side 523 of attachment plate may be constructed of and/or coated with a material, such as vinyl, leather, or synthetic leather, or any other suitable material, including the same material used in construction of belt 512. According to one aspect, outer side 523 may be screen printed or otherwise adorned with ornamental patterns and/or designs. According to another aspect, outer side 523 may include a surface material suitable for temporary adornments, such as dry erase or removable tags.

Inner side 525 of attachment plate 511 may be constructed of a rigid or semi-rigid material, such as plastic or metal. This may provide structure and support to attachment plate 511. According to one aspect, inner side 525 may be coated with material or otherwise cushioned to provide additional back support and comfort to the user without sacrificing its structural aspects.

According to one aspect, all portions of attachment plate 511 may be constructed of rigid or semi-rigid material, such as plastic or metal, and may optionally include additional cushioning material and/or a material covering.

According to another aspect, flange 527 may represent the outermost edges of inner side 525 of attachment plate 511. According to this aspect, inner plate 525 may be shaped to mirror outer side 523 but may be sized slightly larger to allow outer edges of inner side 525 to extend beyond outer edges of outer side 523.

Handle 516 may be constructed from plastic or a similar rigid or semi-rigid material. According to one aspect, handle 516 may be molded as a part of inner side 525. According to this aspect, outer side 523 may have a pass-through opening to allow handle 516 to extend through outer side 523.

According to another aspect, handle 516 may be separately constructed and attached to attachment plate 511 in any suitable manner, including a series of apertures and bolts similar to those used with respect to clamp assembly 14 of transport device 10. According to another aspect, handle 516 may be removably attached to attachment plate 511 through use of tongue and groove connections. It should be recognized that other methods of attachment may be utilized without deviation from the scope of the disclosure herein.

Handle 516 may be similar to handle 16 in that is may have a generally cylindrical shape and include a hollow interior 598 which may allow strap 518 to pass through handle. Strap 518 may be substantially similar to strap 18 and/or strap 218, and may be similarly adjustable in length.

According to one aspect, handle 516 may include a flattened outer surface 535 which may allow for screen printing or other adornments similar to outer side 523.

Belt 512 may further include attachment plate receiver 513 which may have a receiving channel 537, a latching member 539, and a backing 543.

Receiving channel 537 may have a left side 545 and a right side 547, defining therebetween a longitudinal direction, and a bottom side 549 across from an open side 551, therebetween defining a vertical direction. Left side 545, right side 547, and bottom side 549 may correspond to left edge 515, right edge 517, and bottom edge 521 of attachment plate 511. Channel 537 may further take an open "U" shape corresponding to the trapezoidal shape of attachment plate 511 and configured to accept flange 527 within channel 537. Channel 537 may further include stop receiving openings 553 placed and configured to receive stop members 529 from attachment plate 511.

Latching member 539 may correspond to a latch receiving opening 541 within bottom edge 521 of attachment plate 511 and be configured to secure attachment plate 511 within channel 537. Latching member 539 may further include a tab or protrusion (not shown) that may interact with a groove within latch receiving opening 541 (not shown). Such latches are known and may be applied according to their expected principles of operation.

Attachment plate receiver 513 may be integrally formed with belt 512 or may be removably attached to belt 512. According to one aspect, backing 543 may be attached to belt 512 by hook and loop closures 528 to secure attachment plate receiver 513. According to another aspect, backing 543 may be attached to belt 512 through other suitable removable, semi-permanent, or permanent attachments, such as stitching, welding, adhesives, snaps, buttons, or the like.

According to another aspect, backing 543 may be of sufficient thickness to allow for other fasteners, such as bolts, screws, or the like to be utilized.

According to another aspect, backing 543 may be constructed of a fabric or fabric-like material and may be stitched or welded to belt 512.

It will be understood that other attachments for attachment plate receiver 513 beyond those explicitly discussed herein may be utilized as desired without deviation from the scope of the disclosure herein.

With reference to FIG. 11, an article of luggage 106 is shown with an attachment plate 511 stowed within an attachment plate receiver 513 on an exterior wall. Attachment plate receiver 513 may be integrally formed on an article of luggage 106 or may be attached to an existing article of luggage 106. The inclusion of attachment plate receiver 513 on an article of luggage 106 may allow installation of strap 518 on luggage handle 108 according to the discussion below, and may allow for storage of the attachment plate 511 when not connected to belt 512. According to this aspect, belt 512 may be worn without being connected to attachment plate 511, allowing user freedom to move about without luggage in tow, if so desired.

Transport device 510 may further include one or more accessory pockets (not shown) that are substantially similar to accessory pocket 104.

Figure 12:
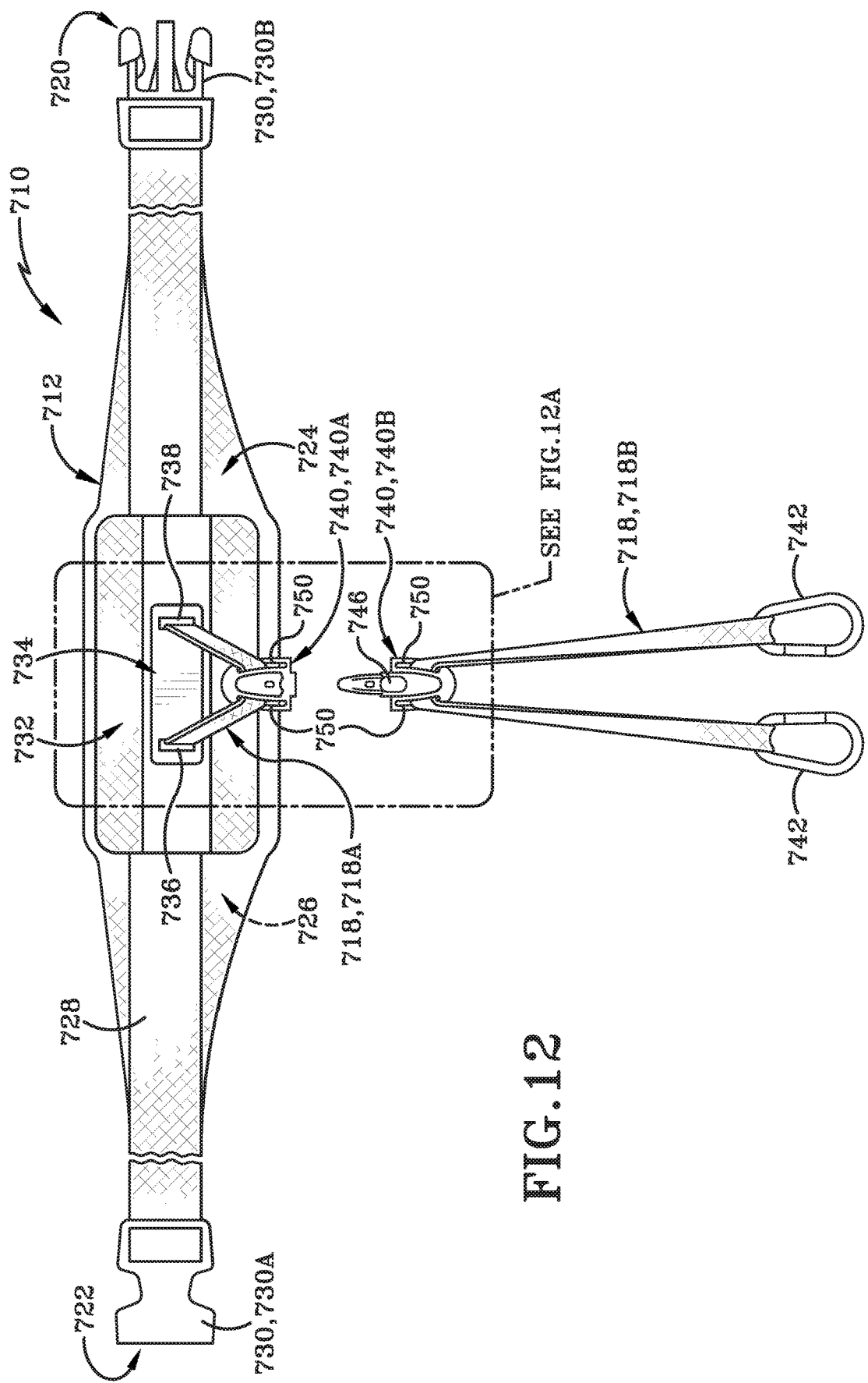
FIG. 12 is a rear elevation view of a third alternate embodiment of a transport device.
Figure 12A:
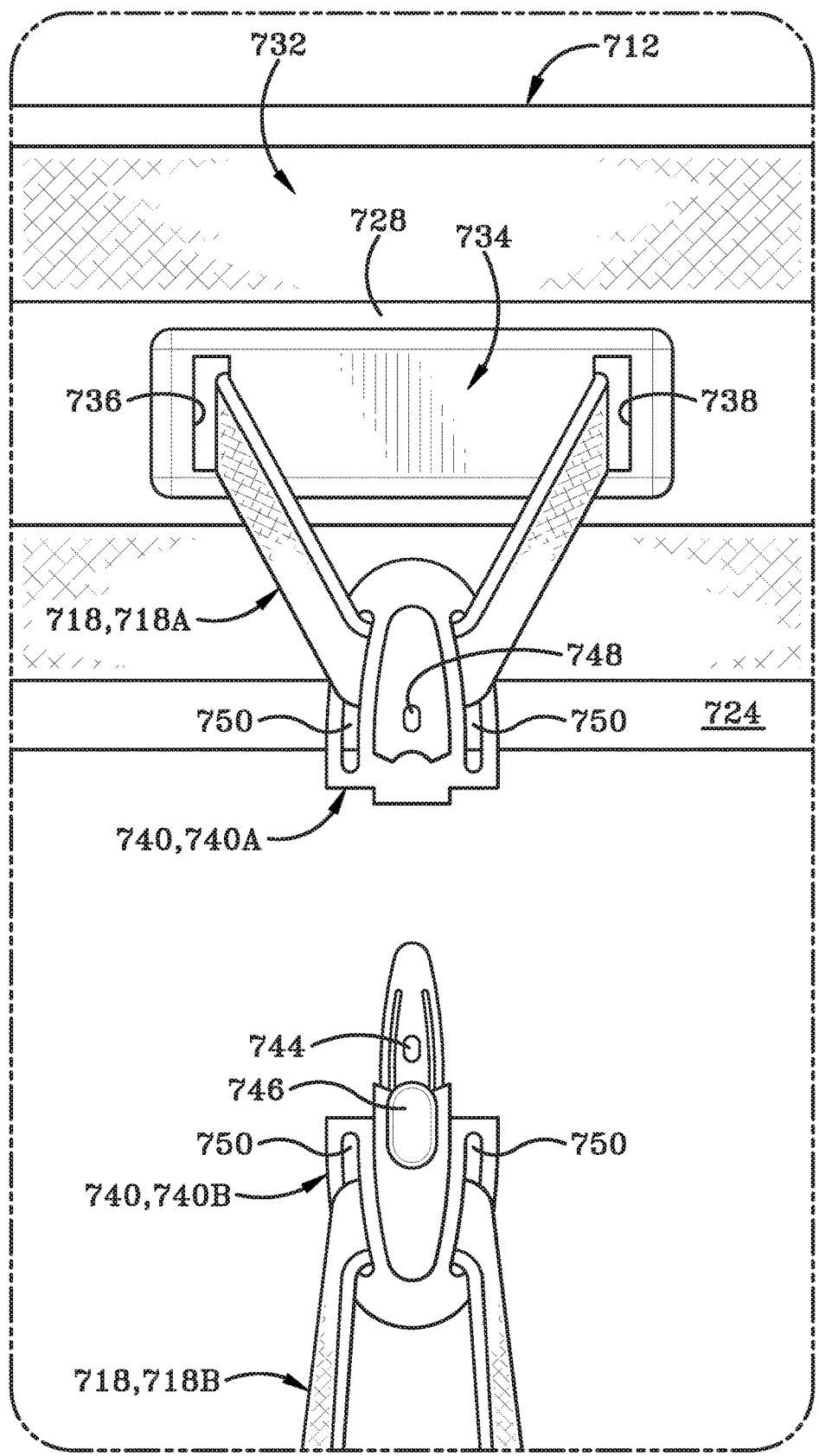
FIG. 12A is an enlarged view of the latch of the third alternate embodiment of a transport device as indicated from FIG. 12.
Figure 13:
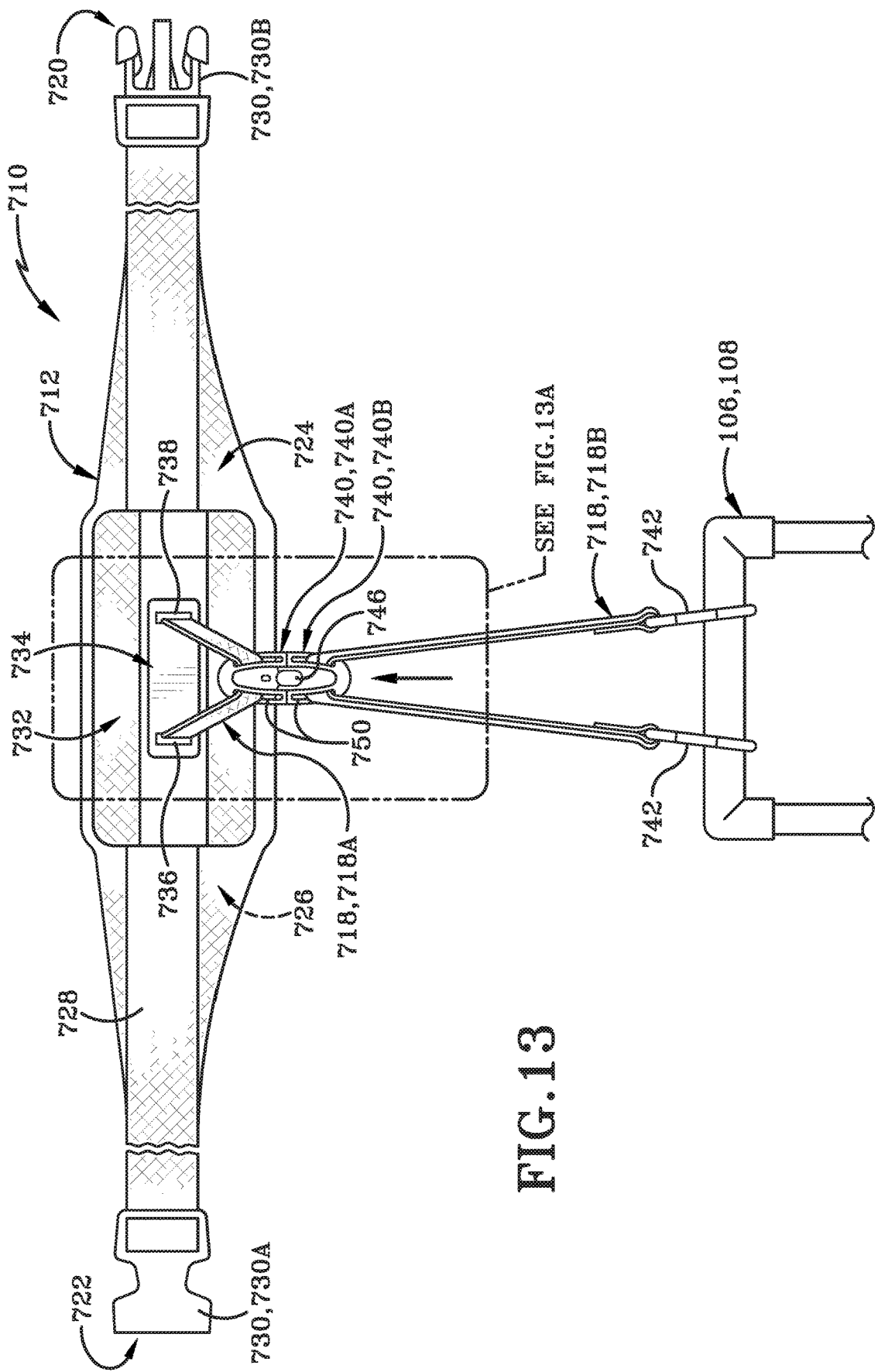
FIG. 13 is a rear elevation view of the third alternate embodiment of a transport device with a secured connector and an article of luggage installed.
Figure 13A:
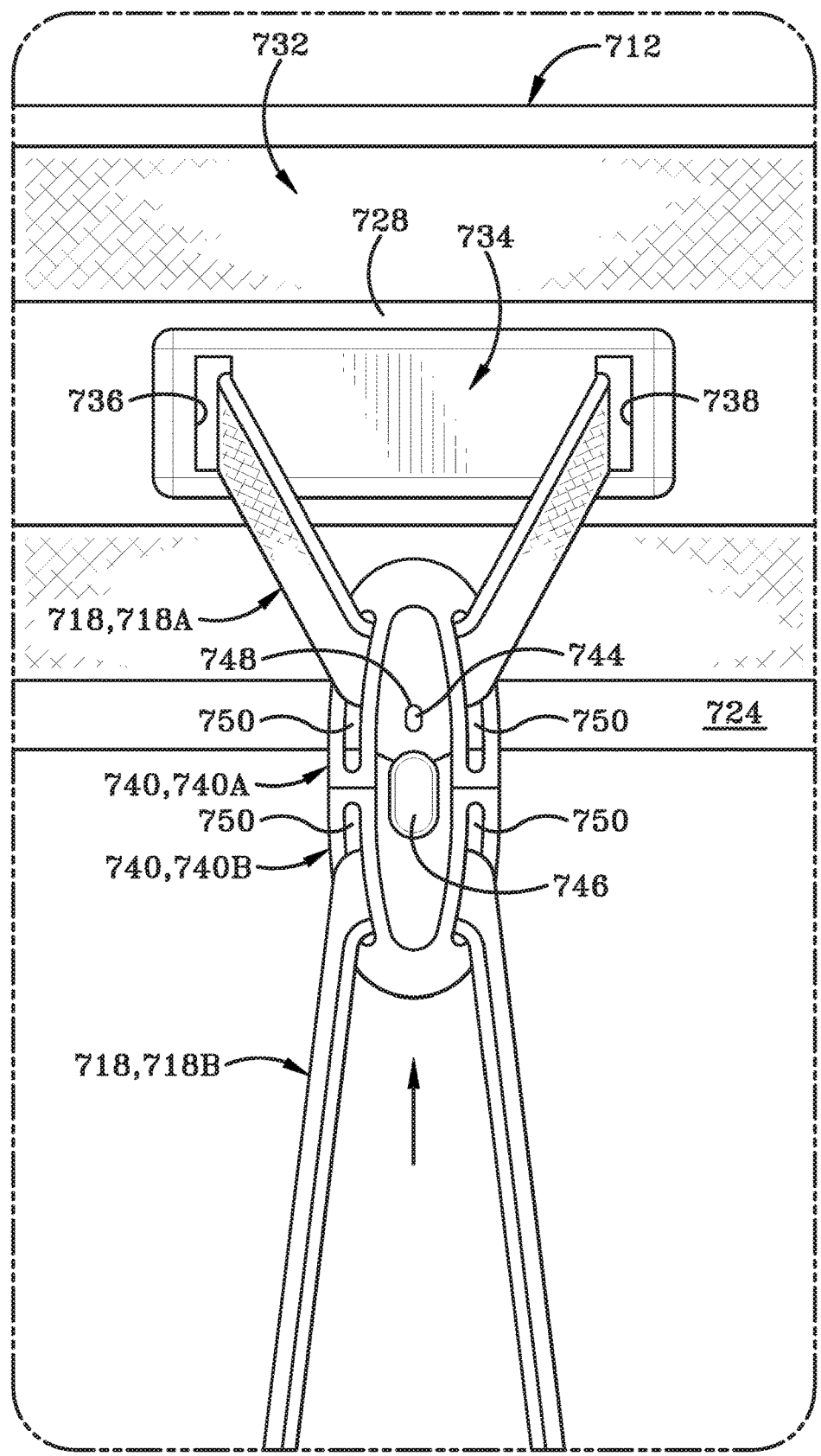
FIG. 13A is an enlarged view of the latch of the third alternate embodiment of a transport device as indicated from FIG. 13 with a secured connector.

With reference to FIGS. 12-13A, a third alternative embodiment of transport device is shown and generally indicated as reference 710. Transport device 710 may be similar to one or more of transport devices 10, 210, and/or 510 in that it may be a belt 712 with a first end 720, a second end 722, an outer surface 724, and an inner surface 726. Belt 712 may further attach to an article of luggage 106 via a luggage handle 108 (best seen in FIGS. 12A and 13A).

Transport device 710 may differ from the other embodiments in that belt 712 may include a two-piece strap 718 with a belt segment 718A and a removable luggage segment 718B, a band 728, and a buckle 730.

Two-piece strap 718 may be similar to straps 18, 218, and 518 in that it may connect the transport device 710 to an article of luggage 106, however, two-piece strap 718 may have a belt segment 718A that may be affixed or connected to belt 712 and a luggage segment 718B that may be removable therefrom via a strap clip 740, as discussed below. Two-piece strap 718 may be formed from a material that is strong enough to handle the load applied thereto from the weight of a piece of luggage 106 while maintaining flexibility and durability over time. By way of non-limiting examples, two-piece strap 718 may be formed of any material, such as nylon webbing, para-cord, leather, or any other suitable material.

Two-piece strap 718 may be adjustable in length, similar to straps 18, 218, and/or 518, through employment of known adjustment mechanisms. According to one aspect, two-piece strap 718 may be adjustable on the belt segment 718A, the luggage segment 718B, or both the belt segment 718A and the luggage segment 718B. The adjustable length of two-piece strap 718 may allow a user to customize the position of the wheeled case behind their back during use, as discussed below.

Belt segment 718A of two-piece strap 718 may be connected to belt 712 via a strap plate 734. Strap plate 734 may be a longitudinally elongated piece that may be formed of plastic, metal, or another suitable rigid or semi-rigid material. The strap plate 734 may be semi-permanently or permanently affixed or otherwise connected to belt 712 to provide a secure connection between the two-piece strap 718 and the belt. Belt segment 718 of two-piece strap 718 may be a continuous loop of material that may be fed through a first opening 736 and a second opening 738 defined in strap plate 734. The elongation of strap plate 734 may serve to separate the openings 736, 738 to provide two spaced apart points to distribute the load of an attached piece of luggage 106 more evenly to the sides of the wearer's spine. According to one aspect, belt segment 718A of two-piece strap 718 may also be affixed or attached to belt 712, such as through stitching, welding, hook and loop closures, adhesives, or the like to further support the load of an attached piece of luggage 106 more securely.

Belt segment 718A of two-piece strap 718 may include a female portion 740A of the strap clip 740 for easy and rapid connection to a piece of luggage 106 (via luggage segment 718B of two-piece strap 718, as discussed below). Belt segment 718A may connect to female portion 740A of strap clip 740 by being threaded through slots 750 defined therein, as best seen in FIGS. 12A and 13A.

Luggage segment 718B of two-piece strap 718 may be a strip of material that may be fed through slots 750 on a male portion 740B of strap clip 740 (as best seen in FIGS. 12A and 13A) and may have attachment hooks 742 connected at each end thereof. Attachment hooks 742 may be carabiners (as shown in the figures), clips, s-hooks, or any other suitable attachment device operable to connect luggage segment 718B of two-piece strap 718 to the handle 108 of a piece of luggage 106 (FIGS. 12A and 13A). According to one aspect, attachment hooks 742 may be rubberized or otherwise coated with material to reduce slippage of the hooks 742 on the luggage handle 108 and to protect the handle 8008 from damage.

Figure 4:
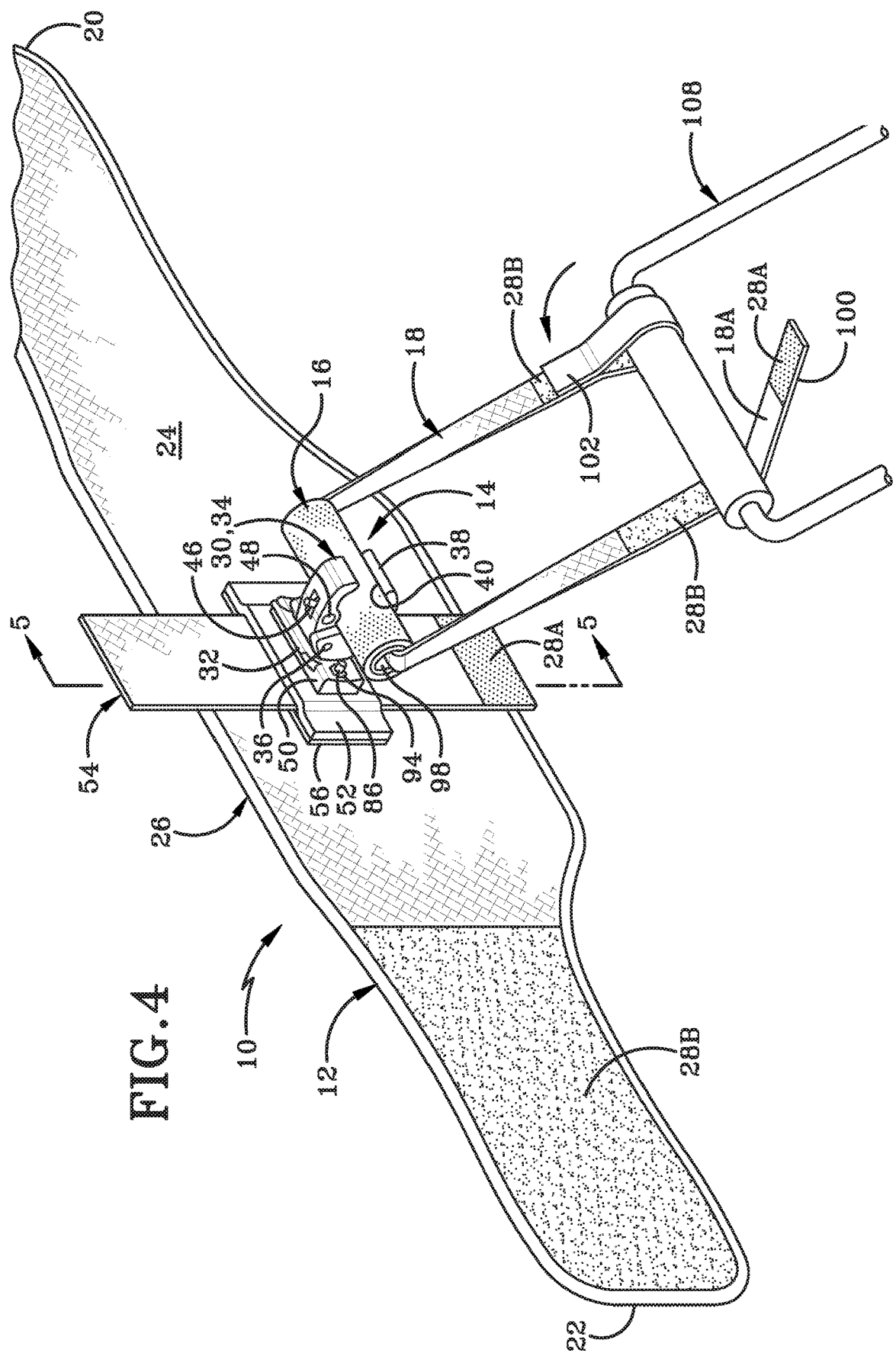
FIG. 4 is a top left isometric rear view of a transport device shown with an article of luggage partially installed.

Attachment hooks 742 may be permanently or semi-permanently connected to the ends of luggage segment 718B of two-piece strap 718, or alternatively may be removable therefrom. For example, the ends of luggage segment 718B may wrap around the body of the hooks 742 and double back on themselves, where they may be stitched, welded, or otherwise permanently or semi-permanently attached. Alternatively, the ends of luggage segment 718B may include a removable attachment, such as hook and loop closures, to allow the hooks 742 to be securely attached, but also removable therefrom. According to this aspect, luggage segment 718B of two-piece strap 718 may resemble the ends 100 and 102 of strap 18, such as is seen in FIG. 4.

Belt 712 may also have a band 728 that may extend longitudinally from first end 720 to second end 722. Band 728 may be a material, such as nylon webbing, that may impart some support to belt 712. Band 728 may alternatively be made of any material suitable for the purpose of supporting belt around a user's waist when being worn. Band 728 may have a buckle 730 with a female connector 730A at one end thereof and a male connector 730B at the opposite end thereof. According to one aspect, buckle 730 may be a plastic snap/clip fastener such as that illustrated in FIGS. 12-13A, or may alternatively be any suitable fastener as dictated by the desired implementation. According to one non-limiting example, band 728 may be leather or synthetic leather and buckle 730 may be a metal belt buckle to impart a more fashionable appearance to belt 712. According to one aspect, band 728 may be adjustable, for example, by having an excess length threaded through one or both of the female and male connectors 730A, 730B to allow a user to loosen or tighten the band 728 as desired. According to another aspect, band 728 may be elastic or have elastic properties to allow a snug fit across a variety of size ranges.

Belt 712 may further include a lumbar panel 732 which may be constructed of the same or of different material than the rest of belt 712. According to one aspect, lumbar panel 732 may be constructed of a breathable mesh fabric to allow air to circulate therethrough to reduce sweating and discomfort to a user while wearing belt 712. According to another aspect, lumbar panel 732 may be padded to increase comfort to the wearer. According to another aspect, lumbar panel 732 may include additional features, such as magnetic discs, vibration discs, or any other features to increase the comfort and/or wearability of transport device 710, as desired.

Although described with regards to particular embodiments, it will be understood that various features and components of transport devices 10, 210, 510, and 710 may be utilized with any embodiment whether specifically described with reference to that embodiment or not. For example, accessory pocket 104 may be utilized with any embodiment of transport device 10, 210, 510, and 710. Similarly, the adjustable band 728, buckle 730, and/or lumbar panel 732 of transport device 710 may readily be adapted for use with other transport devices 10, 210, 510. Other similar features may likewise be interchanged or adapted for use with other embodiments of transport device 10, 210, 510, and 710.

Having thus described transport device 10 and the various embodiments thereof, the operation and method of use therefor will now be discussed.

As transport devices 10, 210, 510, and 710 are all embodiments of a similar device with a similar purpose, it will be understood that the methods of use and operation thereof may be substantially similar across all embodiments. Further, as features of each device 10, 210, 510, and/or 710 may be readily adapted for use with any of these embodiments, it will be understood that the operation or use of those features will be the same or substantially similar across all embodiments. Therefore, references to a particular embodiment below are understood to include all similarly featured embodiments, whether specifically recited or not, unless explicitly stated otherwise.

With reference to FIGS. 4-13A, in operation, transport device 10, 210, 5120, and 710, may be worn substantially about a user's waist. Belt 12 of transport device 10 may be placed with lumbar pad 60 against the small of the user's back and second end 22 of belt 12 is wrapped around user's side and held in front while first end 20 of belt 12 is wrapped around the user's opposite side and attached to second end 22 of belt 12 via hook and loop closures 28A and 28B. This placement puts clamp assembly 14, outer plate 52, clamp assembly restraint 54, and inner plate 56 at the wearer's lower back slightly above the waistline for proper positioning for using and transporting an article of luggage 106. Transport device 10 may be attached to an article of luggage 106 prior to belt 12 being put on a user's waist, or attached to an article of luggage 106 after being put on a user's waist according to the user's preference. Proper placement of belt 12 and transport device 10 may be best seen as shown in FIG. 8.

With reference to FIG. 8A, accessory pocket 104 may be sized to carry most cellular telephones, smart phones, phablets, tablets, or other personal electronic devices. According to one aspect, accessory pocket 104 may include a touchscreen friendly outer surface which may allow user to operate a touchscreen device while worn. According to another aspect, in operation, accessory pocket 104 may carry any personal item the user needs or wishes to keep available, such as a wallet, credit cards, money, or travel documents. According to one embodiment, accessory pocket 104 may be removably attached to belt 12 and may include a portable battery which may be used to charge personal electronics while contained within accessory pocket 104.

With reference to FIG. 6A, the first alternate embodiment of transport device 210 may function substantially similar to transport device 10 in that belt 212 may be worn around a user's waist and attached, with hook and loop closure 228 securing belt 212 in place, and with handle 216 secured to user solely with restraint 254 securing handle 216 to transport device 210. Transport device 210 may attach to luggage 106 in the same manner as transport device 10. Although disclosed as alternative embodiments, transport device 10 and transport device 210 may be interchanged in operation through the removal or addition of clamp assembly 14, as discussed above. Accordingly, it is understood that the operation of transport device 10, further discussed below, is equally applicable to both transport device 10 and 210, with proper adjustment to account for the presence or absence of clamp assembly 14 components.

Strap section 18A may interact with the luggage handle 108 of an associated article of luggage 106 to be transported such that luggage handle 108 does not contact or, alternatively, does not significantly contact hook and loop closure 28A and 28B, respectively. As shown in the figures, article of luggage 108 is contemplated as a common suitcase, although any article of luggage 106 having a luggage handle 108 may be used with this device without deviating from the scope disclosed herein.

Figure 5:
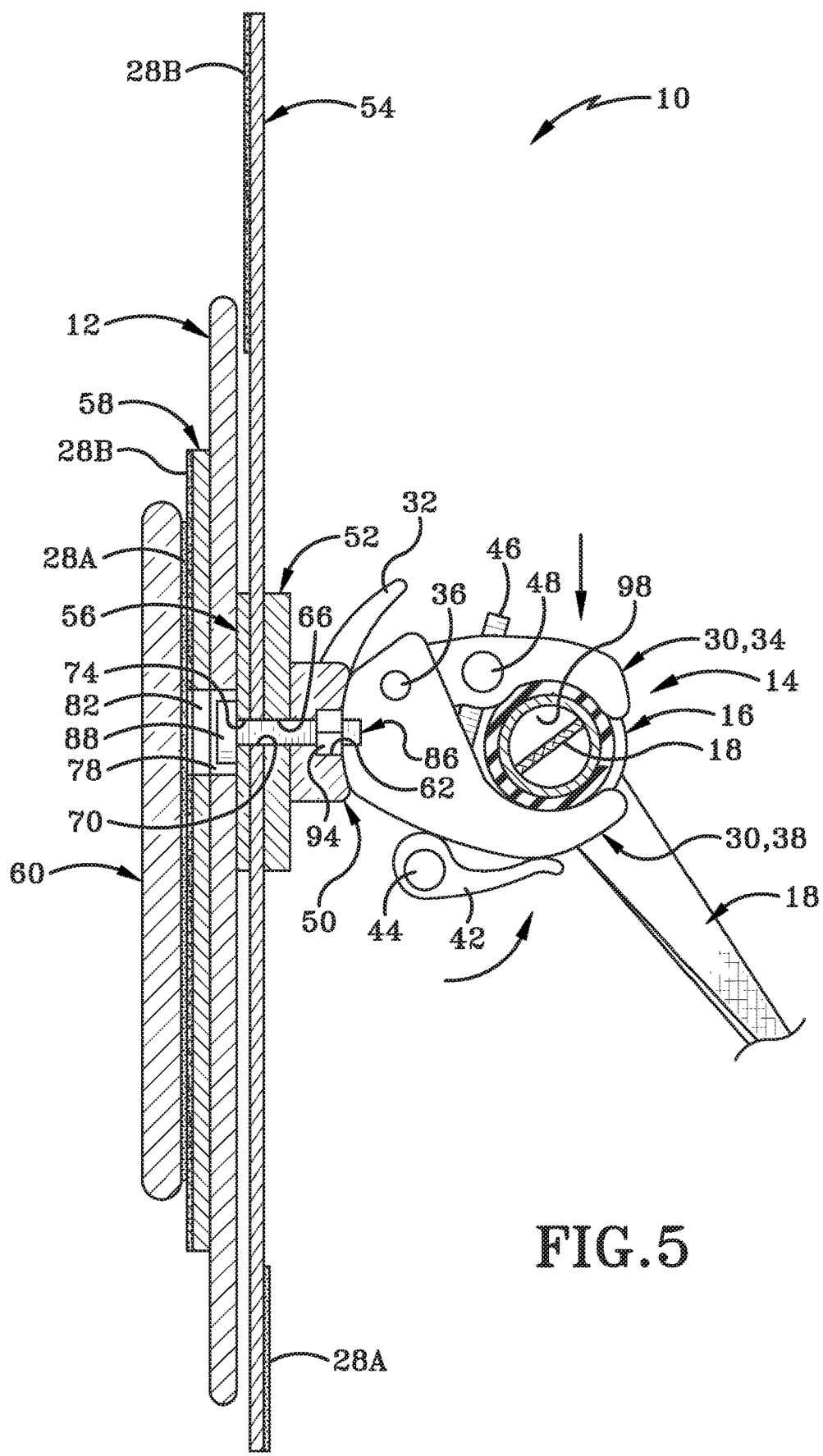
FIG. 5 is a left side cross-section view of a transport device with an article of luggage installed taken along Line 5-5 from FIG. 4.
Figure 7:
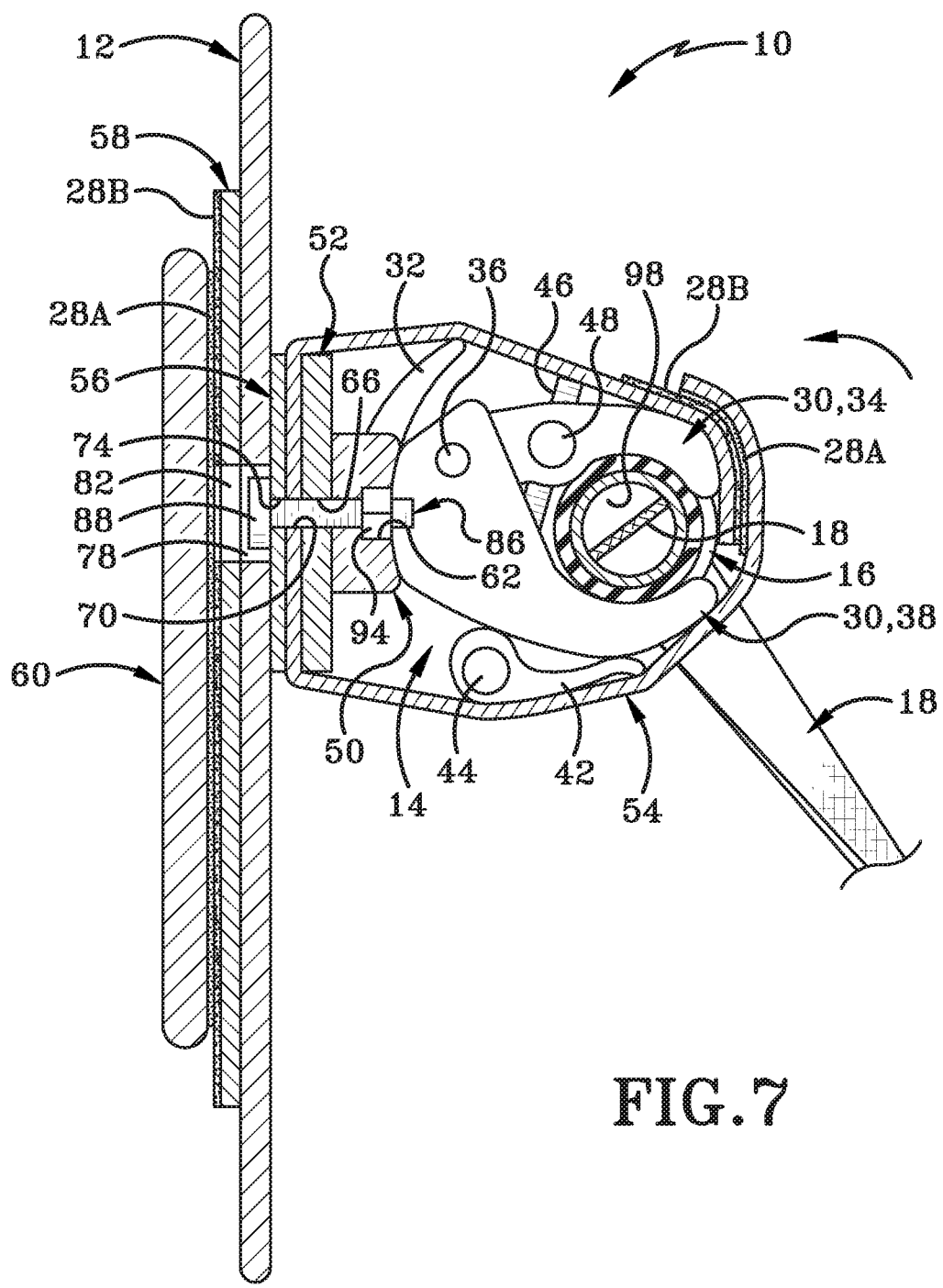
FIG. 7 is a left side cross-section view of a transport device with an article of luggage installed and secured taken along Line 7-7 from FIG. 6.

Installation of handle 16 into clamp 30 may be accomplished by opening toggle 42 into an open position as best seen in FIG. 3 wherein toggle 42 is extended down and away from lower jaw 38 of clamp 30. Handle 16 is then inserted in clamp mouth 40 between upper jaw 34 and lower jaw 38 of clamp 30. Toggle 42 is then rotated about toggle hinge 44 in the direction of the curved arrow as shown in FIG. 5 to a closed position as seen in FIG. 5 thereby pulling upper jaw 34 down in the direction indicated by the arrow in FIG. 5. Upper jaw 34 rotates about clamp hinge 36 thereby closing clamp mouth 40 and securing handle 16 within clamp 30 between upper jaw 34 and lower jaw 38. Operation of clamp 30 may be reversed to remove handle 16 from clamp 30. The grip strength of clamp 30 is adjustable by opening toggle 42 and rotating toggle 42 about an axis substantially defined by toggle screw 46 thereby loosening or tightening toggle screw 46 within toggle nut 48 and correspondingly increasing or reducing the distance between upper jaw 34 and lower jaw 38. Once handle 16 and strap 18 are installed within clamp 30, first end 100 and second end 102 of strap 18 may be wrapped around luggage handle 108 and first end 100 and second end 102 of strap 18 may then be secured back to strap 18 by hook and loop closures 28A and 28B, respectively. According to one aspect, strap 18 may include any other manner of attachment to luggage handle 108 including, but not limited to, clips, hooks, carabiners, or the like. According to another aspect, strap 18 and/or luggage handle 108 may be modified to attach to strap 18 in any suitable way, as desired. When attached and secured by strap 18, as shown in FIG. 6, luggage handle 108 may have two points of contact with transport device 10, via strap 18, to allow luggage to remain properly positioned and stable as it is being transported by transport device 10.

The length of strap 18 may then be adjusted to fit the user according to the user's height, the angle of the wheeled case 106 relative to the user's back, and the distance the wheeled case 106 will sit behind the user. The adjustment of strap 18 may allow the wheeled case 106 to remain a sufficient distance behind the user to prevent the user's heels from striking the wheeled case 106 when walking. This may further prevent a user from having to change or compromise his or her gait while using transport device 10 (and/or 210, 510, and 710).

With reference to FIGS. 9-11, the second alternate embodiment shown may operate in the following manner. Belt 512 may be worn about a user's waist similar to belt 12 and may be secured to user's waist in a similar fashion. Strap 518 may threaded through the hollow interior 598 of handle 516 and affixed to a luggage handle 108 in a similar manner in which strap 18 is affixed to luggage handle 108. Once so attached, flange 527 of attachment plate 511 may slidably engage channel 537 of attachment plate receiver 513. Specifically, a user may align left and right edges 515, 517 of attachment plate 511 with left and right sides 545, 547 of channel 537 and may slide attachment plate 511 into attachment plate receiver 513 until bottom edge 521 contacts bottom side 549, latching member 539 is inserted and housed within latch receiving opening 541, and stop members 529 are inserted and housed within stop receiving openings 553. In this configuration, left and right extensions 531, 533 may be positioned above and adjacent to channel 537 to complete an aesthetically pleasing look while attachment plate 511 is securely engaged with attachment plate receiver 513, and thereby secured to belt 512.

The trapezoidal shape of attachment plate 511 and the corresponding "U" shape of the attachment place receiver 513 and channel 537 may form a dove-tail type connection which may further secure attachment plate 511 with attachment plate receiver 513 and prevent movement of attachment plate 511 within attachment plate receiver 513 in all directions except the vertical, upwards direction. This may increase stability and security of the attached luggage 106 while transport device 510 is in use.

In the secured state, a user may move about and function hands free as described with respect to transport device 10 above.

Removal of attachment plate 511 from attachment plate receiver 513 may be accomplish through applying force in an upward direction sufficient to overcome latching member's 539 engagement with latch receiving opening 541. Once latching member 539 is disengaged, attachment plate 511 may then be slid upwards and out of attachment plate receiver 513.

With reference to FIG. 11, when not secured within attachment plate receiver 513 on belt 512, attachment plate 511 may be inserted into an attachment plate receiver 513 disposed on the exterior of an article of luggage 106. The engagement/disengagement of attachment plate 511 with an attachment plate receiver 513 disposed on an article of luggage 106 may be achieved in an identical way as if attachment plate receiver 513 were disposed on belt 512.

With reference to FIGS. 12-13A, the third alternate embodiment of transport device 710 may operate substantially similar to previous embodiments in that the belt 712 may be worn about a user's waist and may attach to an article of luggage 106. Belt 712 may be places on a user's waist and connected by inserting the male connector 730B into female connector 730A of buckle 730 to secure belt 712 in place.

Luggage segment 718B of strap 718 may be connected to the handle 108 of a piece of luggage 106 by securing hooks 742 thereto. When a user is ready to connect the luggage 106 to transport device 710, the male portion 740B of strap clip 740 may be inserted into the female portion 740A of strap clip 740. The insertion of male portion 740B into female portion 740A may cause a tab 744 on the male portion 740B to align with and extend into an aperture 748 on the female portion 740A, thus locking the strap clip 740 together and securing the luggage 106 to the user via transport device 710. To remove the luggage 106 from transport device, the user then only need to depress a release button 746 on the male portion 740B of strap clip 740 to move the tab 744 out of the aperture 748 to disconnect the female and male portions 740A, 740B of strap clip 740 from each other.

The length of two-piece strap 718 may be adjusted once the strap clip 740 is locked together, or alternatively may be adjusted prior to connecting the female portion 740A and male portion 740B of the strap clip 740 together. As with prior embodiments, adjusting the length of two-piece strap 718 may have the same effect, namely, allowing a user to adjust the angle and/or distance of the wheeled case 106 relative to the user's back to prevent interference of the user's gait.

If the user is done utilizing transport device 710 with the article of luggage 106, the user may disconnect the luggage segment 718B of strap 718 from the handle 108 of the luggage 106 by removing the attachment hooks 742 therefrom.

Although described herein as a "wheeled case," "an article of luggage," and/or "luggage," it will be understood that the transport device described herein may operationally attach to other objects according to a user's desired application. It will be further understood that the item to which the transport device attaches need not be limited by the examples provided herein.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An apparatus for transporting a wheeled case comprising:
   a belt;
   a connector secured to the back of the belt;
   a strap coupled to the connector and adapted to connect to a handle of a wheeled case; and
   a clamp assembly operable to secure the connector to the back of the belt via a clamp.

2. The apparatus of claim 1 wherein the belt further comprises:
   a clamp assembly restraint operable to cover the clamp assembly, the clamp, and the handle, when the handle is secured within the clamp.

3. The apparatus of claim 1 wherein the connector further comprises:
   an assembly restraint operable to secure a handle having a hollow interior to the belt; and
   a strap threadably engaged through the hollow interior of the handle.

4. The apparatus of claim 3 wherein the strap is coupled to the belt via the assembly restraint and handle, and is further connected to the handle of the wheeled case.

5. The apparatus of claim 1 wherein the strap further comprises:
   a belt segment secured to the connector, the belt segment carrying one of a male and a female portion of a strap clip thereon; and
   a luggage segment connected to the handle of the wheeled case; the luggage segment carrying the other of the male portion and the female portion of the strap clip thereon.

6. The apparatus of claim 5 wherein the male portion and the female portion of the strap clip secure the wheeled case to the belt when mated.

7. The apparatus of claim 6 wherein the luggage segment of the strap is removably connected to the handle of the wheeled case by one or more attachment hooks.

8. A method of transporting a wheeled case comprising the steps of:
   securing a belt having a clamp attached to the back thereof to a user's waist;
   connecting a strap to a connector via a threadable engagement therewith; attaching the strap to a handle of a wheeled case;
   securing the connector to the belt via the clamp; and
   causing the wheeled case to be moved without further interaction by the user's hands.

9. The method of claim 8 further comprising:
   adjusting at least one of the angle and the distance of the wheeled case relative to the user's back.

10. The method of claim 8 wherein the connector further comprises:
    an attachment plate having a flange on at least one edge thereof;
    a handle having a hollow interior connected to the attachment plate; and
    a receiver connected to the belt, the receiver configured to slidably engage the flange on the attachment plate.

11. The method of claim 10 further comprising:
    threading a strap through the hollow interior of the handle;
    connecting the strap to the handle of the wheeled case; and
    sliding the attachment plate into the receiver.

12. The method of claim 8 further comprising:
    attaching a belt segment of a two-piece strap carrying one of a male and a female portion of a strap clip thereon to the connector;
    attaching a luggage segment of the two-piece strap carrying the other of the male portion and the female portion of the strap clip thereon to the handle of the wheeled case; and
    connecting the male portion of the strap clip to the female portion of the strap clip to secure the wheeled case to the user's back.

13. The method of claim 12 wherein connecting the male portion of the strap clip to the female portion of the strap clip can be accomplished with a single hand.

14. An apparatus for transporting a wheeled case comprising:
    a belt;
    an attachment plate having a flange on at least one edge thereof;
    a connector operably connected to the attachment plate;
    a strap threadably engaged with the connector and adapted to connect to a handle of a wheeled case; and
    a receiver connected to the belt, the receiver configured to slidably engage the flange on the attachment plate.

15. The apparatus of claim 14 wherein the receiver comprises a channel which receives the flange.

16. The apparatus of claim 14 wherein the connector is removably attached to the attachment plate.

* * * * *